United States Patent
Barton et al.

(10) Patent No.: US 9,967,298 B2
(45) Date of Patent: *May 8, 2018

(54) APPENDING TO FILES VIA SERVER-SIDE CHUNKING AND MANIFEST MANIPULATION

(71) Applicant: Rackspace US, Inc., San Antonio, TX (US)

(72) Inventors: Michael Barton, San Antonio, TX (US); Will Reese, San Antonio, TX (US); John A. Dickinson, Schertz, TX (US); Jay B. Payne, San Antonio, TX (US); Charles B. Thier, San Antonio, TX (US); Gregory Holt, Hollywood Park, TX (US)

(73) Assignee: Rackspace US, Inc., San Antonio, TX (US)

(*) Notice: Subject to any disclaimer, the term of this patent is extended or adjusted under 35 U.S.C. 154(b) by 2 days.

This patent is subject to a terminal disclaimer.

(21) Appl. No.: 14/930,571

(22) Filed: Nov. 2, 2015

(65) Prior Publication Data

US 2016/0057229 A1  Feb. 25, 2016

Related U.S. Application Data

(63) Continuation of application No. 13/336,095, filed on Dec. 23, 2011, now Pat. No. 9,306,988.

(Continued)

(51) Int. Cl.
*G06F 17/30* (2006.01)
*H04L 29/06* (2006.01)
(Continued)

(52) U.S. Cl.
CPC ............ *H04L 65/403* (2013.01); *G06F 3/065* (2013.01); *G06F 3/067* (2013.01); *G06F 3/0619* (2013.01);
(Continued)

(58) Field of Classification Search
None
See application file for complete search history.

(56) References Cited

U.S. PATENT DOCUMENTS 5,440,727 A    8/1995  Bhide et al.
6,256,643 B1   7/2001  Cork et al.
(Continued)

*Primary Examiner* — Jau-Shya Meng
(74) *Attorney, Agent, or Firm* — Haynes and Boone, LLP

(57) ABSTRACT

The object storage system divides files into a number of object segments, each segment corresponding to a portion of the object, and stores each segment individually in the cloud storage system. The system also generates and stores a manifest file describing the relationship of the various segments to the original data file. Requests to retrieve the segmented file are fulfilled by consulting the manifest file and using the information from the manifest to reconstitute the original data file from the constituent segments. Modifying, appending to, or truncating the object is accomplished by manipulating individual segments and the manifest file. Manipulation of the individual object segments and/or the manifest is also used to implement copy-on-write, snapshotting, software transactional memory, and peer-to-peer transmission of the large file.

17 Claims, 12 Drawing Sheets

Related U.S. Application Data

(60) Provisional application No. 61/450,166, filed on Mar. 8, 2011.

(51) Int. Cl.
  *G06F 3/06* (2006.01)
  *G06F 11/20* (2006.01)
  *H04L 29/08* (2006.01)
  *G06F 11/10* (2006.01)
  *H04L 12/26* (2006.01)

(52) U.S. Cl.
  CPC .......... *G06F 3/0626* (2013.01); *G06F 3/0644* (2013.01); *G06F 11/1004* (2013.01); *G06F 11/2097* (2013.01); *G06F 17/30153* (2013.01); *G06F 17/30174* (2013.01); *G06F 17/30318* (2013.01); *G06F 17/30371* (2013.01); *G06F 17/30575* (2013.01); *G06F 17/30864* (2013.01); *G06F 17/30887* (2013.01); *H04L 43/106* (2013.01); *H04L 67/06* (2013.01); *H04L 67/1095* (2013.01); *H04L 67/1097* (2013.01); *H04L 69/04* (2013.01)

(56) References Cited

U.S. PATENT DOCUMENTS

| | | |
|---|---|---|
| 7,506,010 B2 | 3/2009 | Kulkarni et al. |
| 7,870,173 B2 | 1/2011 | Bhogal et al. |
| 8,065,267 B2 | 11/2011 | Noda |
| 2002/0042833 A1 | 4/2002 | Hendler et al. |
| 2003/0149709 A1 | 8/2003 | Banks |
| 2007/0088771 A1* | 4/2007 | Bhogal ............ G06F 17/30109 |
| 2008/0052261 A1 | 2/2008 | Valenci |
| 2012/0109907 A1 | 5/2012 | Mandagere et al. |

* cited by examiner

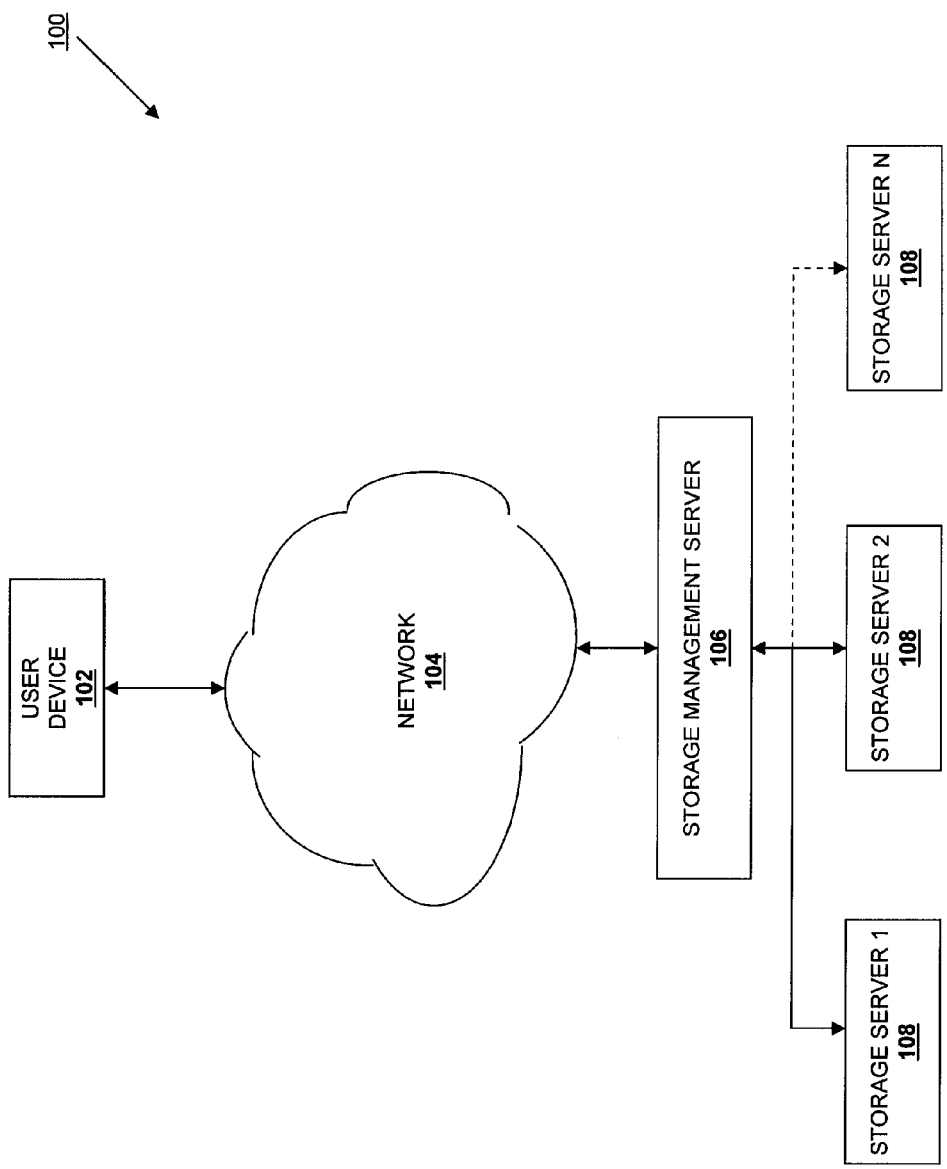

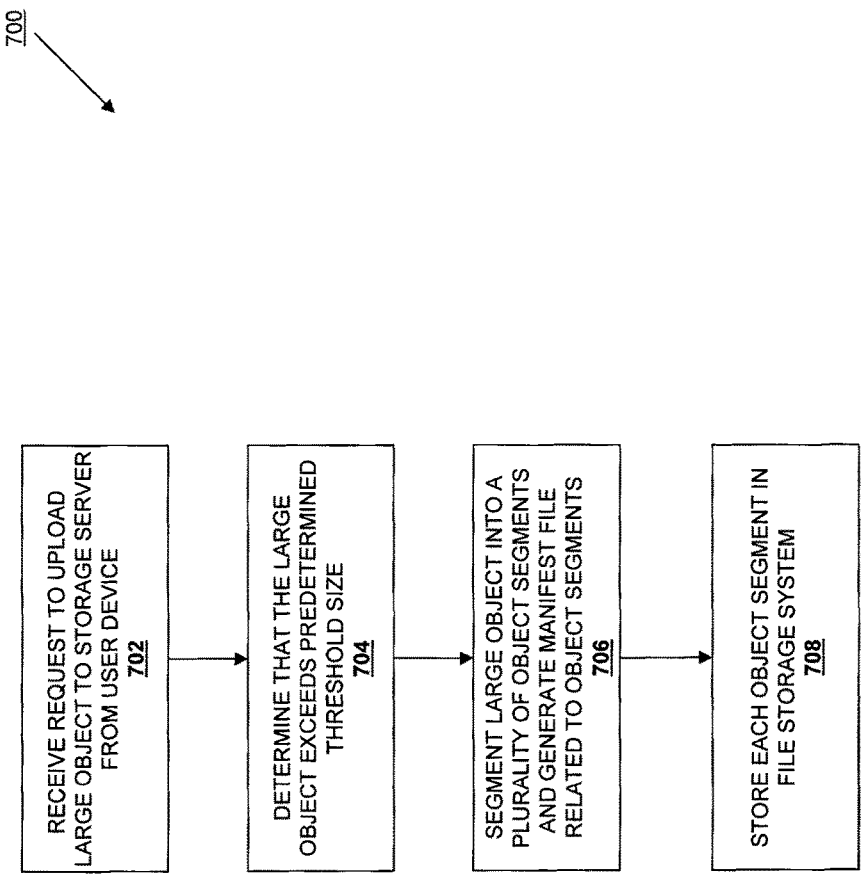

APPENDING TO FILES VIA SERVER-SIDE CHUNKING AND MANIFEST MANIPULATION

PRIORITY DATA

The present application is a continuation application of U.S. patent application Ser. No. 13/336,095, filed Dec. 23, 2011, which claims benefit of U.S. provisional patent application 61/450,166, filed Mar. 8, 2011, entitled "Massively Scalable File Storage System." The present application is also related to co-pending non-provisional U.S. patent application Ser. No. 13/089,442, filed Apr. 19, 2011, Ser. No. 13/089,476, filed Apr. 19, 2011, Ser. No. 13/089,487, filed Apr. 19, 2011, and Ser. No. 13/089,510, filed Apr. 19, 2011. The entirety of these disclosures is hereby incorporated by reference.

BACKGROUND

The present application The present disclosure relates generally to cloud computing, and more particularly to a massively scalable object storage system to provide storage for a cloud computing environment, particularly with regard to the storage and modification of large files.

Cloud computing is a relatively new technology but it enables elasticity or the ability to dynamically adjust compute capacity. The compute capacity can be increased or decreased by adjusting the number of processing units (cores) allocated to a given instance of a processing module (server or node) or by adjusting the overall quantity of processing modules in a system. Cloud computing systems such as OpenStack abstract the management layer of a cloud and allow clients to implement hypervisor agnostic processing modules.

As the use of cloud computing has grown, cloud service providers such as Rackspace Hosting Inc. of San Antonio, Tex., have been confronted with the need to greatly expand file storage capabilities rapidly while making such expansions seamless to their users. Conventional file storage systems and methods to expand such systems suffer from several limitations that can jeopardize data stored in the object storage system. In addition, known techniques use up substantial resources of the object storage system to accomplish expansion while also ensuring data safety. Finally, the centralization of data storage brings with it issues of scale. A typical local storage system (such as the hard drive in a computer) may store thousands or millions of individual files for a single user. A cloud-computing-based storage system is designed to address the needs of thousands or millions of different users simultaneously, with corresponding increases in the number of files stored.

An increasingly common use of cloud computing is computations on so-called "big data"—datasets that are much larger than memory and are frequently much larger than the available disk space on any particular computer. Current datasets can be so large that they become difficult to store and process, and the storage and processing of large datasets is only set to increase over time. Depending on the type of data, this may involve datasets that are terabytes, exabytes or zettabytes in size. Adding to the complication, efficient dataset processing may require random (as opposed to sequential) access. Applications of large dataset processing include meteorology, genomics, economics, physics, biological and environmental research, Internet search, finance, business informatics, and sociological analysis. Information technology and security organizations also may generate extensive activity logs requiring massive amounts of storage.

Accordingly, it is desirable to provide an improved scalable object storage system with support for large object processing and storage.

SUMMARY

In one embodiment, there is shown a method for storing object data in a cloud storage system. After receiving a request to store an object in the cloud storage system, the system evaluates whether to segment the object. If the object is not to be segmented, then it is stored as-is. If it is to be segmented, then it is divided into a number of object segments, each segment corresponding to a portion of the object, and each of which is stored individually in the cloud storage system. The system also generates a manifest file describing the relationship of the various segments to the original data file, and stores the manifest.

In a currently preferred embodiment, a request to retrieve the file is fulfilled by consulting the manifest file and using the information from the manifest to reconstitute the original data file from the constituent segments. In some embodiments, this will simply be done by streaming the various segments one after another, concatenating them together. In other embodiments, however, the overall data file may be structured, such as a database, and some sort of collation or reduce procedure may be needed to reconstitute the original file.

If the object later needs to be modified, appended to, or truncated, this can be done by saving the new information in a new segment and modifying the manifest file to point to the new segments. A later request to retrieve the file will simply stream the contents as directed by the modified manifest file.

In one embodiment, the segmented file storage is used to implement a copy-on-write system. A second manifest is generated in response to a detected write, and changes are localized to particular segments. By using the different manifests, the file can exist in more than one place and have more than one version, but only the differences will be stored.

In another embodiment, the segmented storage is used to implement software transactional memory. Changes are isolated as in the copy-on-write embodiment, but then non-conflicting changes can either be merged (committed) or rolled back completely. At all times, those interacting with the system see a consistent state because each writer has a private copy of the manifest.

In another embodiment, the segmented object storage is used to store and snapshot a filesystem. Changes to the filesystem are represented at either the block, inode, or file level, and the snapshots can be maintained just as a series of manifest files and differential changes stored in the object storage system.

In another embodiment, peer-to-peer file sharing protocols, such as Bittorrent, are used to rapidly upload and download segmented files. For example, each object storage server with a part of the file can advertise that portion for download, and the server with the manifest can advertise and seed the entire file.

The specifics of these embodiments as well as other embodiments are described with particularity below.

BRIEF DESCRIPTION OF THE DRAWINGS

FIG. 1a is a schematic view illustrating an embodiment of a file storage system.

FIG. 1b is a schematic view illustrating an embodiment of an information handling system used in the file storage system of FIG. 1a.

FIG. 2 is a schematic view illustrating an embodiment of a logical structure provided by the file storage system of FIG. 1a.

FIG. 7a is a flow chart illustrating an embodiment of a method for storing large object data.

DETAILED DESCRIPTION

Figure 1B:
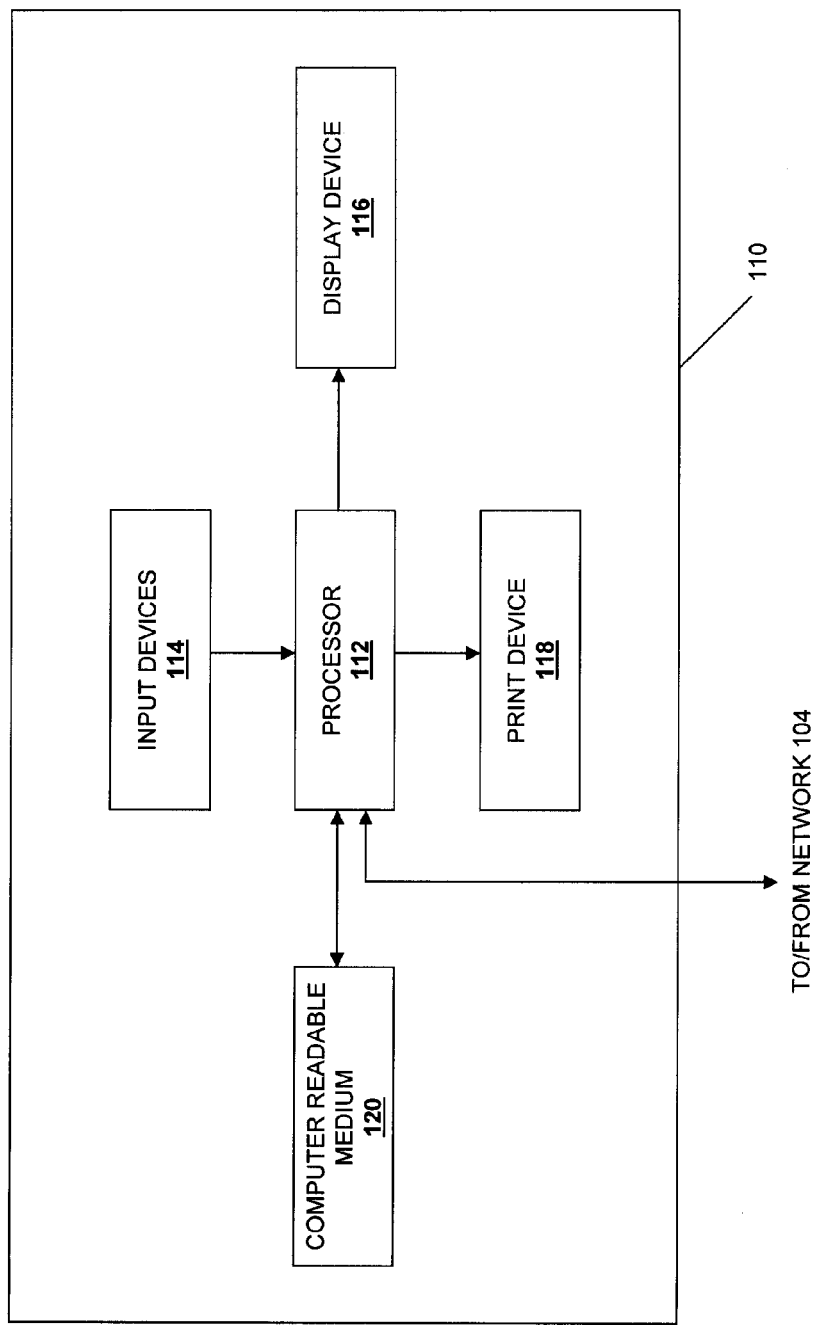

Referring now to FIG. 1a, an embodiment of a file storage system 100 is illustrated. The file storage system 100 includes a user device 102 connected to a network 104 such as, for example, a Transport Control Protocol/Internet Protocol (TCP/IP) network (e.g., the Internet.) A storage management server 106 is connected to the network 104 and to a plurality of storage servers 108. While only one user device has been illustrated as connected to the network 104 for clarity of discussion, one of skill in the art will recognize that a plurality of user devices may, and typically will, be connected to the network 104. While only one storage management server coupled to a plurality of storage servers has been illustrated as connected to the network 104 for clarity of discussion, one of skill in the art will recognize that a plurality of storage management servers, each connected to a plurality of storage servers may, and typically will, be connected to the network 104. Each of the user device 102 and the storage management server 106 includes a respective network interface for communicating with the network 104 (e.g., outputting information to, and receiving information from, the network 104).

Each of the user device 102, storage management server 106, and the plurality of storage servers 108 may include a respective information processing system, a subsystem, or a part of a subsystem for executing processes and performing operations (e.g., processing or communicating information). An information processing system is an electronic device capable of processing, executing or otherwise handling information. Examples of information processing systems include a server computer, a personal computer (e.g., a desktop computer or a portable computer such as, for example, a laptop computer), a handheld computer, and/or a variety of other information handling systems know in the art.

Referring now to FIG. 1b, an information processing system 110 which is representative of one of, or a portion of, the information processing systems described above, is illustrated. The information processing system 110 may include any or all of the following: (a) a processor 112 for executing and otherwise processing instructions, (b) a plurality of input devices 114, which are operably coupled to the processor 112, for inputting information, (c) an optional display device 116, which is operably coupled to the processor 112, for displaying information, (d) an optional print device 118, which is operably coupled to the processor 112, for printing visual images, scanning visual images, and/or faxing visual images, (e) a computer-readable medium 120, which is operably coupled to the processor 112, for storing information, as discussed further below, and (f) various other electronic circuitry for performing other operations of the information processing system 110 known in the art. For example, the information processing system 110 may include (a) a network interface (e.g., circuitry) for communicating between the processor 110 and the network 104 and/or other devices, and (b) a memory device (e.g., FLASH memory, a random access memory (RAM) device or a read-only memory (ROM) device for storing information (e.g., instructions executed by processor 112 and data operated upon by processor 112 in response to such instructions)).

The computer-readable medium 120 and the processor 110 are structurally and functionally interrelated with one another as described below in further detail, and information processing system of the illustrative embodiment is structurally and functionally interrelated with a respective computer-readable medium similar to the manner in which the processor 112 is structurally and functionally interrelated with the computer-readable medium 120. As discussed above, the computer-readable medium 120 may include a hard disk drive, a memory device, and/or a variety of other computer-readable media known in the art, and when including functional descriptive material, data structures are created that define structural and functional interrelationships between such data structures and the computer-readable medium 120 (and other aspects of the system 100). Such interrelationships permit the data structures' functionality to be realized. For example, the processor 112 reads (e.g., accesses or copies) such functional descriptive material from the computer-readable medium 120 onto the memory device of the information processing system 110, and the information processing system 110 (more particularly, the processor 112) performs its operations, as described elsewhere herein, in response to such material stored in the memory device of the information processing system 110. In addition to reading such functional descriptive material from the computer-readable medium 120, the processor 112 is capable of reading such functional descriptive material from (or through) the network 104. In one embodiment, the computer-readable medium is non-transitory.

Figure 2:
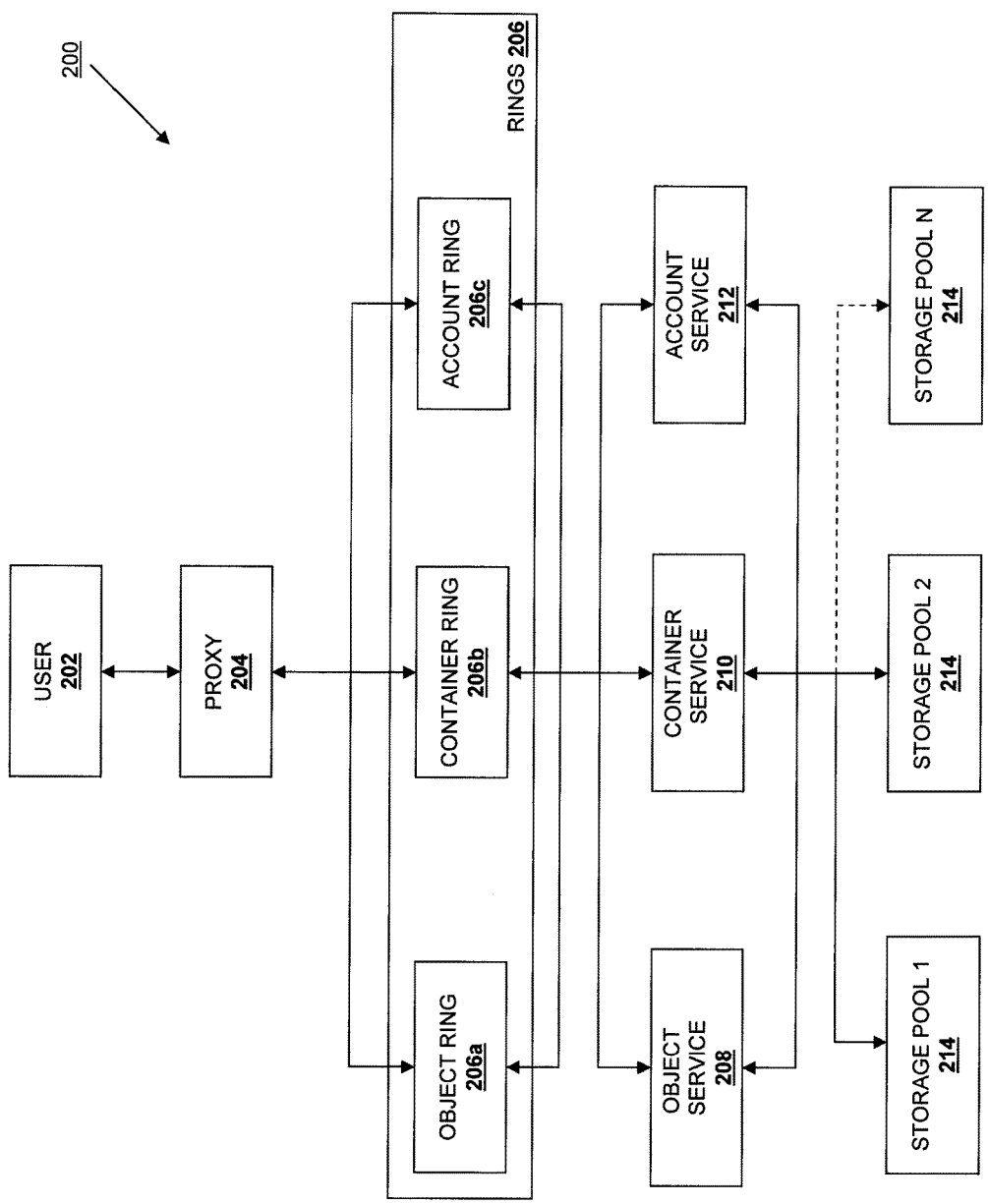

Referring now to FIGS. 1a and 2, the file storage system of FIGS. 1a and 1b creates a logical structure 200. The logical structure 200 includes a user 202 connected to a proxy 204. In one embodiment, the user 202 may be provided by the user device 102, the proxy 204 may be provided by the storage management server 106, and the user 202/proxy 204 connection may be created by the coupling of the user device 102 to the storage management server 106 through the network 104. The proxy 204 is connected to one or more rings 206 such as an object ring 206a, a container ring 206b, and an account ring 206c, described in further detail below, that are connected to an object service 208, container service 210, and an account service 212, respectively, described in further detail below. In other embodiments, there are other types of objects managed by rings, such as a structured data ring, a graph storage ring, or another type of ring (not pictured). In such embodiments, each ring would be connected to an appropriate service, such as a structured data service, a graph service, or another service (not pictured).

Each of object service 208, the container service 210, and the account service 212 are connected to a plurality of storage pools 214. In one embodiment, the rings 206 may include software that is stored on a computer-readable medium location in the storage management server 106 and/or the storage servers 108. In one embodiment, the object service 208, the container service 210, and the account service 212 may include software that is stored on a computer-readable medium located in the storage management server 106 and/or the storage servers 108. In one embodiment, the storage pools 214 may be provided by the storage servers 108. In one embodiment, the proxy 204/rings 206/object service 208/container service 210/account service 212/storage pool 214 connections may be created by the connection of the storage management server 106 with the storage servers 108. In a further embodiment, the rings are implemented at least in part using electrical circuits on a semiconductor chip to achieve better speed and latency.

In one embodiment, each storage pool 214 is provided by a separate storage server 108 or includes a virtual server that is included in a portion of one of the storage servers 108 or across a plurality of the storage servers 108. For example, the storage servers 108 may be physically located in one or more data centers, and the resources of the storage servers 108 may be virtualized according to the requirements of a plurality of users (e.g., the user 202) such that the plurality of storage pools 214 are provided to the plurality of users in order to store files and/or data objects. Thus, resources for a particular virtual server or storage pool may span across multiple storage servers 108.

Figure 3:
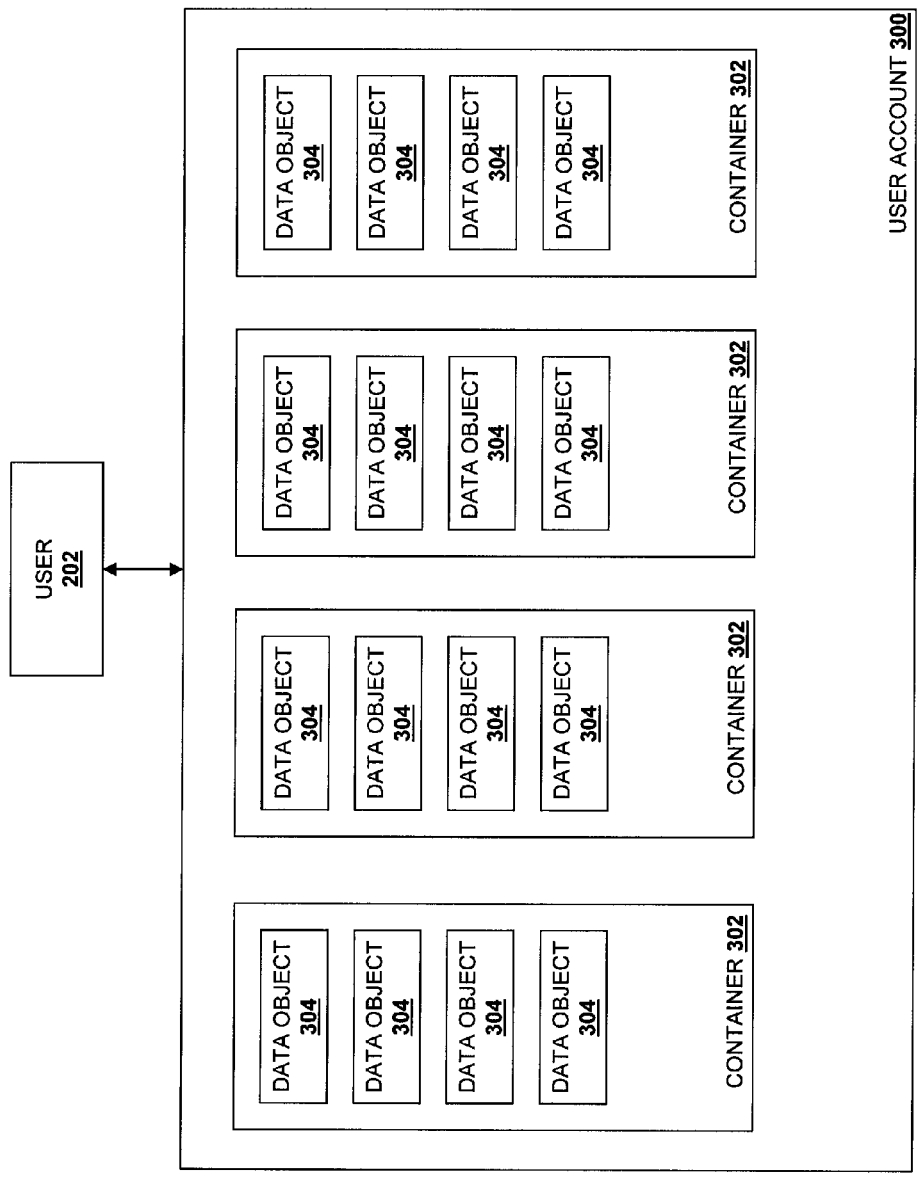
FIG. 3 is a schematic view illustrating an embodiment of a user account.

Referring now to FIG. 3, the user 202, which is exemplary of a plurality of users that use the file storage system 100, has a user account 300 with the file storage system 100 to store and receive data objects, and that user 202 may create a plurality of containers 302 in the user account 300 and store a plurality of data objects 304 in each of the containers 302 for retrieval. In the discussion below, a user account is referred to as an "account", a container is referred to as a "container", and a data object us referred to as an "object" for clarity of discussion. One of skill in the art will recognize that the terms "account", "container" and "object" are generic forms of data naming that are used to direct the file storage system 100 to a specific data object. When other types of rings and services are used, an appropriate name may be substituted. For clarity, discussion of alternative rings and services will be limited to the "account", "container" and "object" rings and services.

The components of the file storage system 100 and some of their functions will now be described in detail.

The Rings 206

As discussed above, the rings 206 are implemented in a tailored electrical circuit or as software instructions to be used in conjunction with a processor to create a hardware-software combination that implements the specific functionality described herein. To the extent that software is used to implement the rings, it may include software that is stored on a computer-readable medium location in the storage management server 106 and/or the storage servers 108. Referring back to FIG. 2, the rings 206 include semiconductor circuits and/or computer-executable instructions that, when executed by a processor, provide subsystems of the file storage system 100 that provide a mapping between the entities stored in the file storage system 100 and the locations of those entities in the storage pools 214. In the illustrated embodiment, the file storage system 100 includes a separate object ring 206a, container ring 206b, and account ring 206c, and when components of the file storage system 100 need to perform any operation on an object, container, or account, those components interact with the object ring 206a, container ring 206b, and account ring 206c, respectively, to determine the location of that stored entity in the storage pools 214. However, one of skill in the art will recognize that different ring structures may be provided (e.g., a single ring for the objects, containers, and accounts, more than one ring for each of the objects, containers, and account, etc.) without departing from the scope of the present disclosure. The rings 206 maintain the availability and safety of data in the file storage system 100 through the use of zones, partitions, replicas, and the storage pools 214, as described below.

A zone is defined as one or more of the storage pools 214 that are subject to a correlated loss of access or data as a result of a particular event. For example, each storage server 108 in the file storage system 100 may be defined as a storage pool in a separate zone, as each storage server 108 is subject to loss of access to its stored objects as a result of a storage device failure, a catastrophic event at the location where the storage server resides, and/or a variety of other object access-loss scenarios known in the art. For the same reasons, a drive in a storage server 108 may be defined as a storage pool in a separate zone, a plurality of storage servers 108 in a given storage rack or cabinet as a storage pool in a separate zone, a plurality of storage servers 108 coupled to the same switch as a storage pool in a separate zone, a plurality of storage servers 108 in a given datacenter as a storage pool in a separate zone, a plurality of storage servers 108 connected to a common power system as a storage pool in a separate zone, etc. One of skill in the art will recognize that the examples of zones provided above are not limiting, and a variety of zones known in the art will fall into the scope of the present disclosure.

Logically, a partition is an abstract storage bucket. As discussed in further detail below, the file storage system 100 maps each partition to a plurality of storage pools 214 that are in different zones, and stores data using those partitions. The mapping of a given partition to a plurality of storage pools 214 creates a plurality of partition replicas of that partition (e.g., equal to the number of storage pools 214 the partition is mapped to.) For example, when a given partition is mapped to 3 storage pools 214 that are in different zones, 3 partition replicas of that partition are created.

The object ring 206a for the management of objects will be described in detail below. However, one of skill in the art will recognize how the discussion may be applied to the container ring 206b, the account ring 206c, and/or a ring for any other stored entity, without departing from the scope of the present disclosure.

In various replicated, network-based file storage systems, an object from a user is received by a proxy. To determine where the object should be stored, some attribute of the object or the object data itself is hashed. If necessary, some attribute of the object is modified so that three different results are returned from the hashing function. The object is then replicated and stored in the storage pool corresponding to the number returned by the hash function.

Under typical circumstances, a consistent hashing function is used as the hash function. The use of the consistent hashing function ensures that there will be minimal changes to the assigned storage pools given a change in membership due to adding or removing new storage pools.

Although the consistent hashing function results in minimal changes to the storage location, sometimes the assignments made by the consistent hashing function or the rearrangements needed due to a change in membership may have undesirable storage characteristics. For example, such methods have been found to result in multiple object replicas for the same object being stored in one or more storage pools that are in the same zone. As discussed above, this is undesirable because then multiple (and possibly all) object replicas for the same object are subject to being lost as a result of a particular event. Alternatively, rebalancing the replicas due to a change in membership has been found to require the movement to two of the replicas 4% of the time, and the movement of all three replicas 1% of the time. It is desirable to never have to move more than one replica at a time.

Figure 4:
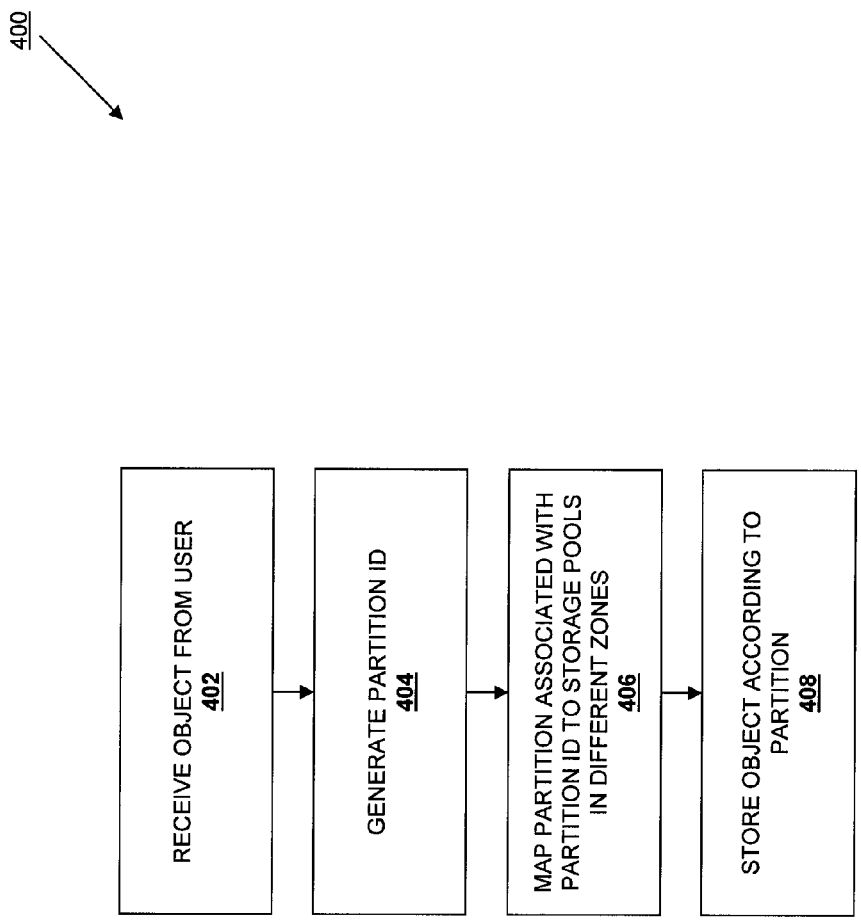
FIG. 4 is a flow chart illustrating an embodiment of a method for storing an object.

In one embodiment, the file storage system 100 solves the problem of multiple object replicas for the same object being stored in storage pools that are in the same zone through the use of the rings 206. Referring now to FIG. 4, a method 400 for storing stored entities is illustrated. At block 402, an object is received by a user. In one embodiment, an object is received from the user 202 by the proxy 204. The method 400 then proceeds to block 404 where a partition identification is generated. In one embodiment, a consistent hash function is applied to the object received in block 402, and the hash function returns a partition identification that corresponds to a partition. The method 400 then proceeds to block 406 where the partition associated with the partition identification is mapped to storage pools that are in different zones. This mapping function is constrained so that the physical location of the storage pools is required to have one or more desirable properties, such as having each partition replica in a separate zone.

There are various embodiments of the constrained mapping function. In one embodiment, the constrained mapping function is the output of a constraint satisfaction solver, in which the desired storage characteristics (such as the requirement that each replica of a partition be in a different availability zone) are inputs to the solving function. The solver then uses one or more search methodologies within the solution space to find a storage layout that maps partitions to storage pools in a desirable manner.

In a second embodiment, a constrained mapping function is applied to portions of the partition identification (e.g., the portions of the partition identification that the constrained mapping function is applied to) may be bits of the output of the original hashing function is applied to the object. For example, the number of bits to which the constrained mapping function is applied may be known as the partition power, and 2 to the partition power may indicate the partition count. The constrained mapping function is designed to return a storage pool location for each portion of the partition identification to which it is applied, and the storage pool locations returned for a given partition identification will each correspond to storage pools 214 in different zones. These storage pool locations are then associated with the partition identification. Thus, the partition corresponding to the partition identification is replicated multiple times in the file storage system 100 (i.e., a partition replica is included in each storage pool corresponding to the storage pool locations determined from the constrained mapping function.) The method 400 then proceeds to block 408 where the object is stored according to the partition. The object received by the user 202 in block 402 of the method 400 may then be stored according to the partition corresponding to the partition identification, which results in multiple object replicas for the object being stored in storage pools that are in different zones in the file storage system 100. In another embodiment, the constrained mapping function is used to determined storage pool locations that are in different zones for each partition prior to the object being received by the user 202, discussed in further detail below.

The output of the constrained mapping function signifies a particular storage pool where a replica of the partition should be stored. An example of this output is as follows: When an object is received from the user 202 at block 402 of the method 400, and at block 404 of the method 400, a hash function is applied to the object. In one exemplary embodiment, the user 202 provides data including an account/container/object name to the proxy 2004, and a hash function is applied to the account/container/object name as follows:

Hash function (account/container/object name)==123456789

Where 123456789 is the partition identification that is returned by the hash function. At block 406 of the method 400, the partition mapping number may then be divided into 3 parts (e.g., the first three digits, the second three digits, and the third three digits of the partition identification,) and the constrained mapping function is applied to each of those parts:

Constrained mapping function (123)==storage pool location (zone 1)
Constrained mapping function (456)==storage pool location (zone 7)
Constrained mapping function (789)==storage pool location (zone 3)

As discussed above, the constrained mapping function is designed to return the storage pool location (zone 1), storage pool location (zone 7), and storage pool location (zone 3) that correspond to storage pools that are in different zones (e.g., zones 1, 3, and 7). The storage pools locations are then associated with the partition identification:

Partition identification: (storage pool location (zone 1)), storage pool location (zone 7), storage pool location (zone 3))

Thus, the partition corresponding to the partition identification is replicated across storage pools that are in different zones (here, zones 1, 3, and 7.) At block 408 of the method 400, the object received from the user 202 is then stored, using the partition corresponding to the partition identification, in each of the storage pools corresponding to the storage pool locations returned by the application of the constrained mapping function to portions of the partition identification. Thus, 3 replicas of the object received from the user 202 are stored in the file storage system 100 in storage pools that are located in different zones (zones 1, 3, and 7.) In one embodiment, each of the storage pool locations are IP addresses, i.e., when each of the storage pools are separate storage servers. In one embodiment, the constrained mapping function is a hash function. However, one of skill in the art will recognize that a variety of functions may be used to ensure that each partition is mapped to storage pools that are in different zones without departing from the scope of the present disclosure.

In another embodiment, the constrained mapping function is applied to the file storage system 100 before the object is received by the user 202 at block 402 in order to accomplish the mapping of the partitions to storage pools described above with reference to block 406 of the method 400. For example, the total number of partitions and the total number of storage servers/storage pools in the file storage system 100 may (and typically will) be known. With that knowledge, the constrained mapping function is used to map each partition in the file storage system 100 to a plurality of storage pools that are in different zones, and that information is stored in a constrained mapping database. For example, a constrained mapping database may include partitions mapped to storage pools such as:
Partition 1: (storage pool location (zone 1)), storage pool location (zone 2), storage pool location (zone 3))
Partition 2: (storage pool location (zone 4)), storage pool location (zone 5), storage pool location (zone 6))
Partition 3: (storage pool location (zone 7)), storage pool location (zone 8), storage pool location (zone 9))

In one embodiment, the output of the constrained mapping function can be saved for optimized lookup. For example, the saved output may be embodied in a file provided to each of the storage pools 214, or stored in a database that is available for the appropriate systems to query. If the saved output is contained within a file, the storage pools 214 may then periodically check the modification time of this file and reload their in-memory copies of the ring structure as needed.

Thus, when an object is received from a user 202 at block 402, the hash function is applied to that object to get the partition identification (e.g., partition 1, 2, or 3 in the example above) at block 404, and then at block 406, the partition identification may then be used with the constrained mapping database to determine the corresponding partition and its associated storage pool locations. This embodiment allows the processing necessary to map partitions to multiple storage pools in different zones to be conducted before objects are received from users so that such processing does not have to be conducted each time an object is received from a user.

Figure 5:
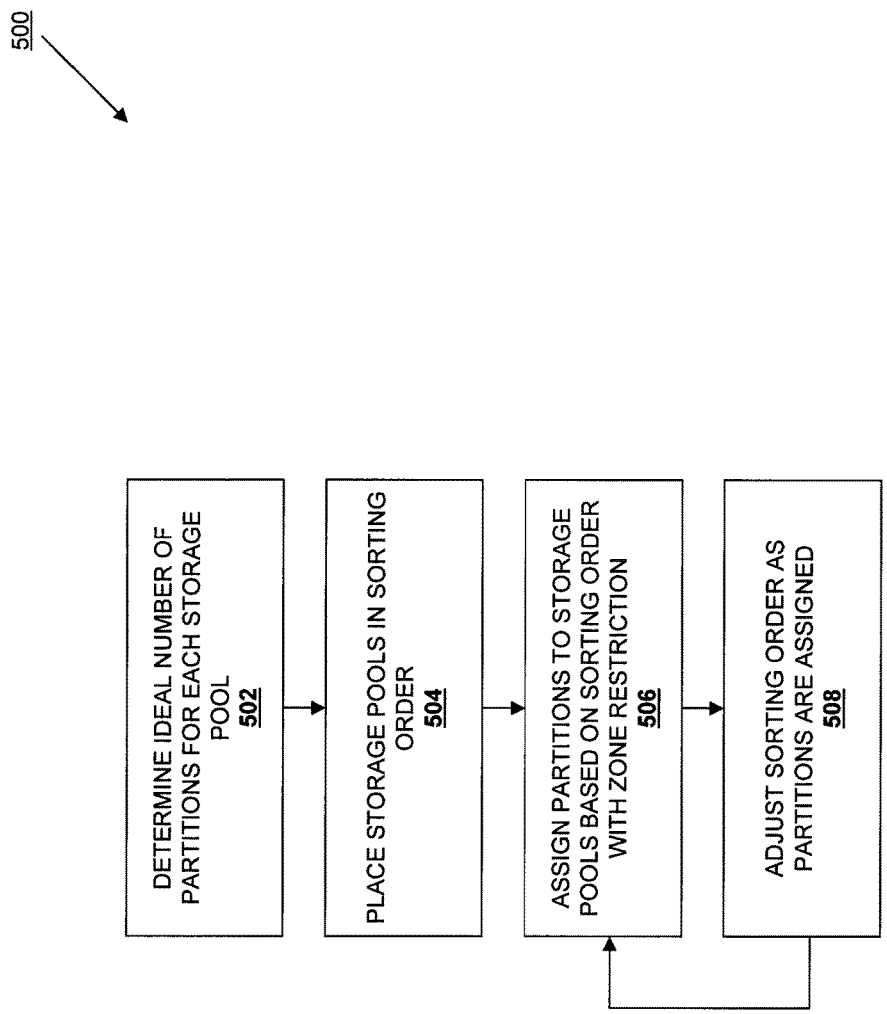
FIG. 5 is a flow chart illustrating an embodiment of a method for creating a ring FIG. 6 flow chart illustrating an embodiment of a method for reassigning partitions in a ring.

For example, referring now to FIG. 5, a method for building a ring 206 is illustrated. At block 502, an ideal number of partitions for each storage pool in the file storage system is determined. In one embodiment, the number of partitions that should ideally be assigned to each storage pool 214 is calculated based the weight (e.g., storage capacity) of each storage pool 214. For example, if the partition power is 20, the ring 206 will have 1,048,576 ($2^{20}$) partitions. If there are 1,000 storage pools 214 of equal weight, each storage pool 214 will ideally be assigned 1,048.576 partitions. This may be referred to as an ideal partition count, and in the example, each storage pool 214 starts off empty with a 1,048.576 ideal partition count. The method 500 then proceeds to block 504 where the storage pools are placed in a sorting order. In one embodiment, the storage pools 214 are placed in a sorting order based on their ideal partition count (e.g., highest to lowest), and this sorting order is maintained throughout the method 500 as partitions are assigned storage pools 214. The method 500 then proceeds to block 506 where partitions are assigned to storage pools based on their sorting order but with a zone restriction. In one embodiment, the partitions are assigned to the storage pool 214 with the highest ideal partition count, but subject to the restriction that the storage pool 214 to which a partition is being assigned is not in the same zone as any other storage pool 214 that includes a partition replica for that same partition. The method 500 then proceeds to block 508 where the sorting order of the storage pools is adjusted. In one embodiment, once a partition is assigned to a storage pool 214, that storage pool 214 will have its ideal partition count decremented and thus that storage pool 214 is moved to a lower position in the sorting order, and the method 500 then returns to block 506 to continue to assign partitions to storage pools based on their sorting order but with the zone restriction. In such a manner, each partition is assigned multiple storage pools 214 in different zones, and thus objects received from users may have multiple object replicas stored in storage pools in different zones simply by associating those objects with the partitions.

As mentioned above, another problem relates to the rebalancing of object replicas stored in the file storage system due to changing membership (i.e., adding or subtracting storage servers or storage pools from the file storage system.) Such methods have been found to require the moving of multiple object replicas of the same object in response to a membership change, which is undesirable.

In one embodiment, the mapping of partitions to multiple storage pools in different zones in the file storage system 100 described above solves these problems. The use of the constrained mapping function to ensure that each partition is mapped to storage pools in different zones ensures that object replicas for the same object are never located in storage pools 214 that are in the same zone (i.e., because any given object received from a user is stored in a partition that is replicated in storage pools that are in different zones.) For example, with each storage server 108 defined as a separate zone, the addition or subtraction of a given storage server 108 from the file storage system 100 thus can only effect one partition replica, and hence one object replica of a given object (i.e., because only one of the partition replica will ever be located on a storage server that is defined as a separate zone.) In similar fashion, the rebalancing associated with changing the zone membership can be accomplished without affecting more than one replica because each zone is guaranteed to only contain one replica of a given partition.

Figure 6:
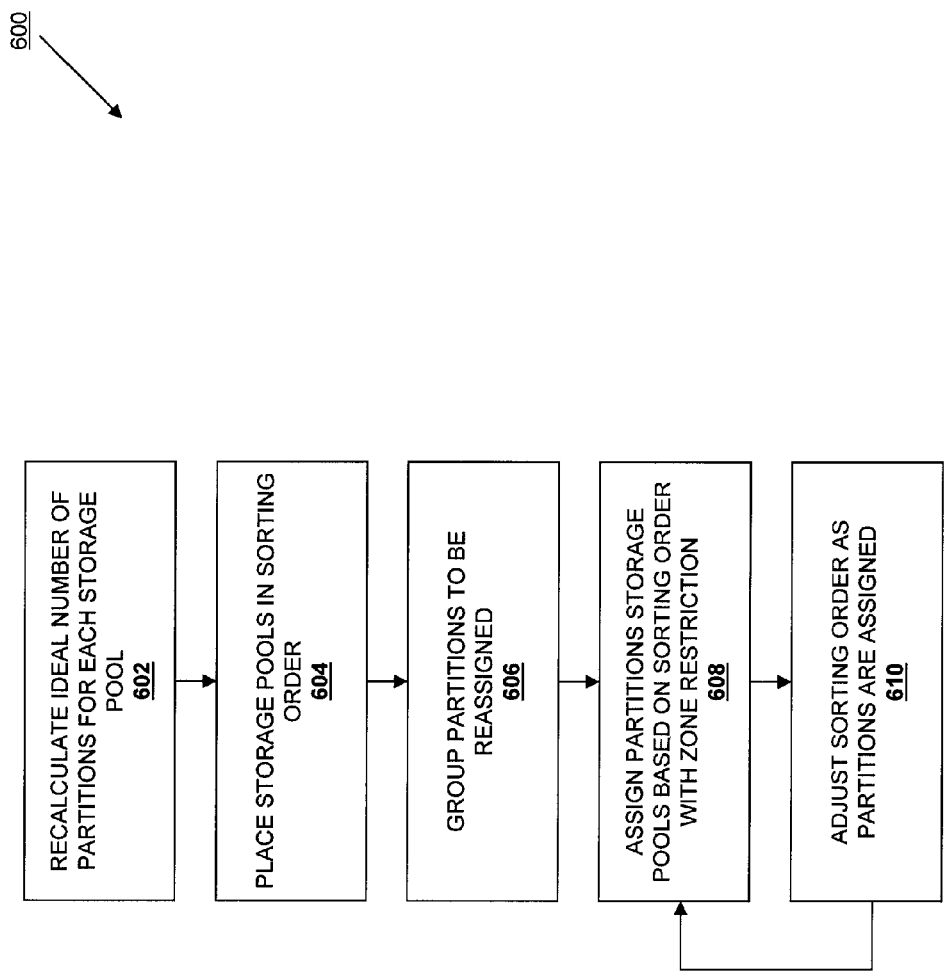

Periodically, partitions may need to be reassigned to different storage pools 214, and the reassignment of partitions will result in the building of a new ring from an old ring. Such an event may occur due to the removal and/or addition of a storage pool 214 from the file storage system 100 (e.g., a membership change.) Referring now to FIG. 6, a method 600 for reassigning partitions in response to the removal of a storage pool is illustrated. The method 600 begins at block 602 where the ideal number of partitions for each storage pool is recalculated. In one embodiment, the ideal partition count for the storage pools 214 remaining in the file storage system 100 (subsequent to the removal of a storage pool) is recalculated. The method 600 then proceeds to block 604 where the storage pools are placed in a sorting order as described above with reference to block 504 of the method 500. The method then proceeds to block 606 where partitions to be reassigned are grouped. In one embodiment, a partition list for the partitions to be reassigned is created. For example, any storage pools 214 that have been removed from the file system 100 may have all their assigned partitions unassigned and added to the partition list, and any storage pools 214 that have more partitions than their ideal partition count may have random partitions unassigned from them and added to the partition list (i.e., such that those storage pools have a number of partitions that is within a predetermined amount of their ideal partition count.) The partitions on the partition list may then be reassigned to the storage pool 214 in blocks 608 and 610 of the method 600 substantially as discussed above with reference to blocks 506 and 508 of the method 500. In one embodiment, at block 608 of the method 600, whenever a partition is reassigned to a storage pool 214, the time of the reassignment is recorded. Reassignment times may be used when gathering partitions to reassign to storage pools 214, such that no partition replica for a given partition is moved twice in a predetermined amount of time. However, such reassignment restrictions based on reassignment times may be ignored for partition replicas on storage pools 214 that have been removed from the file storage system 100, as removing a storage pool 214 only happens upon storage pool 214/storage server 108 failure and thus requires the reassignment of the partitions.

In one embodiment, the method 600 is conducted periodically to help balance the amount of data stored by storage pools 214 in the file storage system 100. For example, the partition reassignment method 600 discussed above may repeated until each storage pool 214 is within a predetermined threshold of a predetermined storage capacity (e.g., within 1% of 60% storage capacity for that storage pool) or when it is determined that partition reassignment will not improve the balance of data stored by the file storage system 100 by more than a predetermined amount. For example, if a first storage server 108 includes 2 TB of storage, a second storage server 108 includes 4 TB of storage, and a third storage server 108 includes 6 TB of storage, data balancing may be conducted to ensure that each of the storage servers 108 holds the same percentage of its storage capacity (i.e., the first storage server 108 holds 0.66 TB of data, the second storage server 108 holds 1.33 TB of data, and the third storage server 108 holds 2 TB of data such that each of the storage servers 108 is at 33% of its storage capacity.) Weights may be applied to storage servers 108 to balance the distribution of data on the storage servers 108 in the file storage system 100 to account for different storage capacities.

Object Service 208

As discussed above, the object service 208 is implemented in a tailored electrical circuit or as software instructions to be used in conjunction with a processor to create a hardware-software combination that implements the specific functionality described herein. To the extent that one embodiment includes computer-executable instructions, those instructions may include software that is stored on a computer-readable medium located in the storage management server 106 and/or the storage servers 108. The object service 208 may include instructions that, when executed by a processor, provide object storage and objection manipulation functionality such that the object service 208 is operable to, for example, store, retrieve and delete stored objects in the storage pools 214. In one embodiment, an object service 208 is provided for each storage pool that holds object data. For example, an object service 208 may be included on a server that further includes one or more storage drives that provide a storage pool for objects. In one embodiment, the objects are stored as binary files with metadata stored as extended attributes of the file in the file system used by the object storage service. In such an embodiment, the object service 208 will uses the extended attributes of the filesystem to manage the metadata. In a second embodiment, the metadata is stored in a machine-readable format next to the data itself. For example, the metadata for a file is stored in a text file or single file database.

In one embodiment, objects are stored by the object service 208 using a path derived by applying a hash function to the name of the object along with a timestamp. For example, an incoming object for a user account to be written to a container will have a hash applied to its account/container/object name and the path generated for the object is:

/objects/<partition>/<storage pool location>/objectname_hash.15673.data where "objects" indicate that the object data is stored in an object storage pool 214, <partition> is the partition identification that maps the object to a partition, <storage pool location> is the storage pool location that maps the partition replica to a storage pool 214 in a different zone than its related partition replicas, objectname_hash is the hash of the account/container/object name, and 15672 is the timestamp.

When there is a request for an object, the file storage system 100 will find all the object replicas in the file storage system 100 that include the objectname_hash and return the object data that has the most recent timestamp value. Special care is needed to record updates that should be persisted as the new canonical value. For example, when an object replica is deleted, a modification sentinel (e.g., a 0 byte "tombstone" file or ".ts" file) is written to the storage pool 214 where the deleted object replica was located and that includes the same objectname_hash as the deleted object replica (i.e., /objectname_hash.15784.ts,) and that tombstone file stays in the file storage system 100 for a predetermined amount of time (e.g., 7 days.) During object replication, discussed in further detail below, when the file storage system 100 encounters a tombstone file, the file storage system 100 checks whether the tombstone file has been in the system for 7 days. If not, the file storage system 100 searches for and deletes any object replicas that it finds related to that tombstone file (e.g., replicas that same objectname_hash as the tombstone file) to ensure that objects that were meant to be deleted from the file storage system 100 are removed and older versions of object replicas of a given object do not appear in the file storage system 100 due to, for example, the temporary failure of a storage server 108 or storage pool 214 that might have prevented the deletion of that object replica previously. If the file storage system 100 determines that a tombstone file has been in the file storage system 100 for longer than the predetermined time, that tombstone file is deleted.

The mechanism used for recording file deletion is also used to record other types of updates. For example, a "purge" marker indicates that the system should overwrite all copies of the object and set the space to free; a "version" marker indicates that the system should create a copy and mark the copy with a version number; and a "ttl" (time-to-live) marker indicates that the system should check an authoritative source for updates after the expiry of a set time period. Other types of out-of-band changes to the file are also contemplated.

Replicators

Replicators are implemented in a tailored electrical circuit or as software instructions to be used in conjunction with a processor to create a hardware-software combination that implements the specific functionality described herein. To the extent that one embodiment includes computer-executable instructions, those instructions may be implemented as an software that is stored on a computer-readable medium located in the storage management server 106 and/or the storage servers 108, and may include instructions that, when executed by a processor, keep the file storage system 100 in a consistent state in the face of temporary error conditions like network outages, storage pool 214 failure, and/or storage server 108 failure. For example, an object replicator may be provided for each storage pool 214 (e.g., a storage server 108 that provides a storage pool) that holds object data. The replicators compare stored entities in their storage pool 214 with each replica of that stored entity in other storage pools 214 in the file storage system 100 to ensure that all related replicas contain the latest version of the stored entity. In one embodiment, object replicators may use a hash list to quickly compare subsections of partitions, while container replicators and account replicators may use a combination of hashes and shared storage account metadata. In one embodiment, replicator updates of stored entities are push based. For example, replicators may compare the replica stored entities in their storage pools 214 with related replica stored entities in other storage pools in the file storage system 100, and if the replicator determines there is a difference between the replicas (e.g., by applying an order independent check sum to the related replicas), the replicator may then push the data that related replica stored entities in other storage pools need in order to be up to date. In one embodiment, the pushed updates include rsyncing replicas to efficiently provide only the data needed by the out-of-date replica. Account and container replicators may either push missing data over HTTP or rsync whole database files in the event it is determined that a push update will be inefficient. The push-based updates discussed above results in replicas being updated generally only from "local" storage pools 214 to "remote" storage pools 214. In one embodiment, this provides a benefit as data in a storage pool 214 may not belong there (as in the case of handoffs and ring changes), and a replicator can't know what data exists elsewhere in the file storage system 100 that it should pull in. Thus, it's the duty of any replicator associated with a given a storage pool 214 that contains data to ensure that data gets to other storage pools where it belongs. As discussed above, replicators may also ensure that data is removed from the system by creating the tombstone files as the latest version of a replica when that replica is deleted, and then search out and removing all replicas related to that tombstone file from the file storage system 100.

Database Replicators

Database replicators are a type of replicator, discussed above, that operate on storage pools 214 that contain accounts or containers (i.e., there may be account replicators and container replicators.) To perform the replication discussed above, the first step that a database replicator may perform may be a low-cost hash comparison to find out whether or not two replicas (e.g., a replica on the database replicators local storage pool 214 and a related replica on a "remote" storage pool 214) already match. Under normal operation, the hash comparison allows relatively quick verification that databases in the file storage system 100 are already synchronized. If the hashes differ, the database replicator may bring the databases in sync by sharing records added since the most recent previous sync point. This most recent previous sync point notes the last record at which two databases were known to be in sync. After all new records have been pushed to the remote database, the sync table (which lists which remote databases a local database is in sync with) of the local database is pushed to the remote database, so the remote database knows it's now in sync with database that the local database has previously synchronized with. If a database replica (e.g., an account replica or container replica) is found to be missing entirely from a storage pool 214 that it should exist in, the entire local database file may be recreated on that storage pool 214 using rsync techniques known in the art. In one embodiment, when an entire local database file is be recreated on a storage pool 214 using rsync, that database may be vested with a new unique id.

Object Replicator

Object replicators are a type of replicator, discussed above, that operate on storage pools 214 that contain objects. In one embodiment, object replicators associated with a storage pool 214 may used techniques known in the art, such as those used with the rsync algorithm, on remote storage pools to determine appropriate data to push data to remote storage pools. However, as object replication times may increase using this method when the file storage system 100 gets sufficiently large, a hash of the contents for each suffix directory may instead be saved to a per-partition hashes file, and the hash for a given suffix directory is then invalidated when the contents of that suffix directory are modified. The object replicator may then read these hash files, calculate any invalidated hashes, and transmit the hashes to each remote storage pool 214 that should hold the partition, and only suffix directories with differing hashes on the remote server are then rsynced. After pushing data to the remote storage pools 214, each rsynced suffix directory has its hashes recalculated. Object replicator performance is generally bound by the number of uncached directories it has to traverse, usually as a result of invalidated suffix directory hashes. In one embodiment, the file storage system 100 is designed so that around 2% of the hash space on a normal storage pool 214 will be invalidated per day.

Updaters

Updaters are implemented in a tailored electrical circuit or as software instructions to be used in conjunction with a processor to create a hardware-software combination that implements the specific functionality described herein. To the extent that one embodiment includes computer-executable instructions, those instructions may include software that is stored on a computer-readable medium located in the storage management server 106 and/or the storage servers 108, and may include instructions that, when executed by a processor, process updates that may have failed. An updater may be provided with each storage pool (e.g., on a server that includes the storage pool) to process failed updates. For example, there may be times when container or account data will not be immediately updated. Such incidents may occur during failure scenarios or periods of high load. If an update of a stored entity fails, the update is queued in a storage pool 214 on the file storage system 100, and the updater that is associated with that storage pool 214 will process the failed updates. In such situations, a consistency window is used. For example, suppose the container service 210 is under load and a new object is put in to the file storage system 100. The object will be immediately available for reads as soon as the proxy 204 responds to the user 202 that the object has been successfully added to the file storage system 100. However, due to the heavy load, a container service 210 may not have been able to update its object listing, and so that update would be queued for a later update. Container listings, therefore, may not immediately contain the object, although the object has been saved and replicated within the applicable object storage pool area. In one embodiment, the consistency window needs only to be as large as the frequency at which the updater runs.

Auditors

Auditors are implemented in a tailored electrical circuit or as software instructions to be used in conjunction with a processor to create a hardware-software combination that implements the specific functionality described herein. To the extent that one embodiment includes computer-executable instructions, those instructions may include software that is stored on a computer-readable medium located in the storage management server 106 and/or the storage servers 108, and may include instructions that, when executed by a processor, check the integrity of the objects, containers, and accounts stored in the storage pools 214. If corruption is found (in the case of bit rot, for example), auditors may quarantine the file, and then replication (discussed above) is used to replace the bad file from another replica. If other errors are found they may be logged (for example, an object's listing can't be found on any container storage that it should be on).

Container API

In one embodiment, APIs for Ring, Account, Container, and other services are defined in terms of REST calls, typically executed over HTTP. These have the general structure:
METHOD/v1/<account>HTTP/1.1
although subsidiary calls may be useful to address particular parts of the object storage namespace, such as:
METHOD/v1/<account>/<container>HTTP/1.1
for container API calls.

In one embodiment, GET operations against the X-Storage-Url for an account are performed to retrieve a list of existing storage containers ordered by name. The following list are optional query parameters that are supported with this request
- limit: For an integer value n, limits the number of results to at most n values.
- marker: Given a string value x, return object names greater in value than the specified marker.
- format: Specify a format for the response, such as json or xml for the respective serialized response.

Using these parameters, an example container list request would be formatted as:

```
GET /<api version>/<account> HTTP/1.1
Host: storage.example.com
X-Auth-Token: eaaafd18-0fed-4b3a-81b4-663c99ec1cbb
```

In this example, a list of containers is returned in the response body, one container per line. A 204 (No Content) HTTP return code is passed back if the account has no containers. For example:

```
HTTP/1.1 200 Ok
Date: Thu, 07 Jun 2010 18:57:07 GMT
Server: Apache
Content-Type: text/plain; charset=UTF-8
Content-Length: 32
images
movies
documents
backups
```

If a format=xml or format=json argument is appended to the storage account URL, the service will serve extended container information serialized in the chosen format. The sample responses below are formatted for readability. For a JSON response:

```
GET /<api version>/<account>?format=json HTTP/1.1
Host: storage.example.com
Content-Length: 0
X-Storage-Token: 182f9c0af0e828cfe3281767d29d19f4
```

The server response is:

```
HTTP/1.1 200 OK
Date: Tue, 25 Nov 2008 19:39:13 GMT
Server: Apache
Content-Type: application/json; charset=utf-8
[
```

-continued

```
{"name":"test_container_1", "count":2, "bytes":78},
{"name":"test_container_2", "count":1, "bytes":17}
]
```

If an XML response is specified, the server response is:

```
HTTP/1.1 200 OK
    Date: Tue, 25 Nov 2008 19:42:35 GMT
    Server: Apache
    Content-Type: application/xml; charset=utf-8
    <?xml version="1.0" encoding="UTF-8"?>
    <account name="AccountName">
        <container>
            <name>test_container_1</name>
            <count>2</count>
            <bytes>78</bytes>
        </container>
        <container>
            <name>test_container_2</name>
            <count>1</count>
            <bytes>17</bytes>
        </container>
    </account>
```

In some embodiments, it is useful to limit the number of responses or to stream responses beyond a certain number. In one embodiment, the system returns a maximum of 10,000 container names per request. To retrieve subsequent container names, another request must be made with a 'marker' parameter. The marker indicates where the last list left off; the system will return container names greater than this marker, up to 10,000 again. Note that the 'marker' value should be URL-encoded prior to sending the HTTP request. If 10,000 is larger than desired, a 'limit' parameter may be given. If the number of container names returned equals the limit given (or 10,000 if no limit is given), it can be assumed there are more container names to be listed. If the container name list is exactly divisible by the limit, the last request will simply have no content. For example, a container with five names (apples, bananas, kiwis, oranges, and pears) will respond as follows with a limit of two:

```
GET /<api version>/<account>?limit=2
Host: storage.example.com
X-Auth-Token: eaaafd18-0fed-4b3a-81b4-663c99ec1cbb
apples
bananas
```

Since we received two items back, we can assume there are more container names to list, so we make another request with a marker of the last item returned:

```
GET /<api version>/<account>?limit=2&marker=bananas
Host: storage.example.com
X-Auth-Token: eaaafd18-0fed-4b3a-81b4-663c99ec1cbb
kiwis
oranges
```

Again, two items are returned; there may be more:

```
GET /<api version>/<account>?limit=2&marker=oranges
Host: storage.example.com
X-Auth-Token: eaaafd18-0fed-4b3a-81b4-663c99ec1cbb
pears
```

With this one-item response we received less than the limit number of container names, indicating that this is the end of the list.

In another embodiment, HEAD operations against an account are performed to retrieve the number of containers and the total bytes stored in the object storage for the account. In one embodiment, this information is returned in two custom headers, X-Account-Container-Count and X-Account-Bytes-Used. Those of skill in the art will recognize that because the storage system is designed to store large amounts of data, care should be taken when representing the total bytes response as an integer; when possible, convert it to a 64-bit unsigned integer if your platform supports that primitive type. An example account metadata request is as follows:

```
HEAD /<api version>/<account> HTTP/1.1
Host: storage.example.com
X-Auth-Token: eaaafd18-0fed-4b3a-81b4-663c99ec1cbb
```

The HTTP return code will be 204 (No Content) if the request succeeds. A 401 (Unauthorized) will be returned for an invalid account or access key. One exemplary response is:

```
HTTP/1.1 204 No Content
Date: Thu, 07 Jun 2010 18:57:07 GMT
Server: Apache
X-Account-Container-Count: 3
X-Account-Bytes-Used: 323479
```

In one embodiment, REST operations can be performed on containers. All operations are valid HTTP request methods as described above. The following list are optional query parameters that are supported with this request
  limit: For an integer value n, limits the number of results to at most n values.
  marker: Given a string value x, return object names greater in value than the specified marker.
  format: Specify a format for the response, such as json or xml for the respective serialized response.
  prefix: For a string value x, causes the results to be limited to object names beginning with the substring x.
  path: For a string value x, return the object names nested in the pseudo path (assuming preconditions are met—see below).
  delimiter: For a character c, return all the object names nested in the container (without the need for the directory marker objects).
  filter: Specify an expression and return results that match (or do not match) the filter expression.
An example list objects request is as follows:

```
GET /<api version>/<account>/<container>[?parm=value] HTTP/1.1
Host: storage.example.com
X-Auth-Token: eaaafd18-0fed-4b3a-81b4-663c99ec1cbb
```

In one embodiment, a list of objects is returned in the response body, one object name per line. A 204 (No Content) HTTP return code will be passed back if the container is empty or does not exist for the specified account. If an incorrect account is specified, the HTTP return code will be 404 (Not Found). The following are exemplary responses. For a response with no format specified:

```
HTTP/1.1 200 Ok
Date: Thu, 07 Jun 2010 18:50:19 GMT
Server: Apache
Content-Type: text/plain; charset=UTF-8
Content-Length: 171
kate_beckinsale.jpg
How To Win Friends And Influence People.pdf
moms_birthday.jpg
poodle_strut.mov
Disturbed - Down With The Sickness.mp3
army_of_darkness.avi
the_mad.avi
```

If a format=xml or format=json argument is appended to the storage account URL, the service will serve extended object information serialized in the chosen format. Other than the ?format=xml|json parameter, it will return the same status/errors codes. The sample responses below are formatted for readability. For a JSON response:

```
GET /<api version>/<account>/<container>?format=json HTTP/1.1
Host: storage.example.com
Content-Length: 0
X-Storage-Token: 182f9c0af0e828cfe3281767d29d19f4
```

The server response is:

```
[
   {"name":"test_obj_1",
    "hash":"4281c348eaf83e70ddce0e07221c3d28",
    "bytes":14,
    "content_type":"application\/octet-stream",
    "last_modified":"2009-02-03T05:26:32.612278"},
   {"name":"test_obj_2",
    "hash":"b039efe731ad111bc1b0ef221c3849d0",
    "bytes":64,
    "content_type":"application\/octet-stream",
    "last_modified":"2009-02-03T05:26:32.612278"},
]
```

If an XML response is specified, the server response is:

```
HTTP/1.1 200 OK
Date: Tue, 25 Nov 2008 19:42:35 GMT
Server: Apache
Content-Length: 643
Content-Type: application/xml; charset=utf-8
<?xml version="1.0" encoding="UTF-8"?>
<container name="test_container_1">
   <object>
      <name>test_object_1</name>
      <hash>4281c348eaf83e70ddce0e07221c3d28</hash>
      <bytes>14</bytes>
      <content_type>application/octet-stream</content_type>
      <last_modified>2009-02-03T05:26:32.612278</last_modified>
   </object>
   <object>
      <name>test_object_2</name>
      <hash>b039efe731ad111bc1b0ef221c3849d0</hash>
      <bytes>64</bytes>
      <content_type>application/octet-stream</content_type>
      <last_modified>2009-02-03T05:26:32.612278</last_modified>
   </object>
</container>
```

In one embodiment, a list of objects is returned in the response body, one object name per line. A 204 (No Content) HTTP return code will be passed back if the container is empty or does not exist for the specified account. If an incorrect account is specified, the HTTP return code will be 404 (Not Found). The following are exemplary responses. For a response with no format specified:

```
HTTP/1.1 200 Ok
Date: Thu, 07 Jun 2010 18:50:19 GMT
Server: Apache
Content-Type: text/plain; charset=UTF-8
Content-Length: 171
kate_beckinsale.jpg
How To Win Friends And Influence People.pdf
moms_birthday.jpg
poodle_strut.mov
Disturbed - Down With The Sickness.mp3
army_of_darkness.avi
the_mad.avi
```

If a filter=expression argument is appended to the storage account URL, the service will process the filter expression and return information that matches the filter. A filter can be formulated to include or exclude certain objects automatically, and may have access to various set API calls or account constants. For example, in one embodiment a filter is defined by a URL-encoded regular expression. For example, a filter could be used to only return content-types that correspond to video types (such as .avi or .mov). For example, a filter expression such as .*(\.mov|\.avi|\.wmv)$ matches any filenames that end with the common video extensions .mov, .avi, and .wmv. This expression is URL encoded and used as a filter as follows:

```
GET /<api version>/<account>/<container>?filter=
.*(\.mov|\.avi|\.wmv)%24 HTTP/1.1
Host: storage.example.com
Content-Length: 0
X-Storage-Token: 182f9c0af0e828cfe3281767d29d19f4
```

The server response is:

```
HTTP/1.1 200 Ok
Date: Thu, 07 Jun 2010 18:50:19 GMT
Server: Apache
Content-Type: text/plain; charset=UTF-8
Content-Length: 171
poodle_strut.mov
army_of_darkness.avi
the_mad.avi
```

In one embodiment, listing a large number of objects is handled in the same fashion as listing a large number of containers; the system will return a maximum of 10,000 object names per request. To retrieve subsequent object names, another request must be made with a 'marker' parameter. The marker indicates where the last list left off and the system will return object names greater than this marker, up to 10,000 again. Note that the 'marker' value should be URL encoded prior to sending the HTTP request. If 10,000 is larger than desired, a 'limit' parameter may be given. If the number of object names returned equals the limit given (or 10,000 if no limit is given), it can be assumed there are more object names to be listed. If the container name list is exactly divisible by the limit, the last request will simply have no content.

In one embodiment, the API allows the creation and manipulation of containers. Containers are storage compartments for your data. PUT operations against a storage container are used to create the container. For example, a request to create a container would be as follows:

```
PUT /<api version>/<account>/<container> HTTP/1.1
Host: storage.example.com
X-Auth-Token: eaaafd18-0fed-4b3a-81b4-663c99ec1cbb
```

No content is returned. A status code of 201 (Created) indicates that the container was created as requested. Container PUT requests are idempotent and a code of 202 (Accepted) is returned when the container already existed. A sample response follows:

```
HTTP/1.1 201 Created
Date: Thu, 07 Jun 2010 18:50:19 GMT
Server: Apache
Content-Type: text/plain; charset=UTF-8
```

DELETE operations against a storage container are used to permanently remove that container. In one embodiment, the container must be empty before it can be deleted. A HEAD request against the container can be used to determine if it contains any objects. An example delete request is as follows:

```
DELETE /<api version>/<account>/<container> HTTP/1.1
Host: storage.example.com
X-Auth-Token: eaaafd18-0fed-4b3a-81b4-663c99ec1cbb
```

In one embodiment, no content is returned. A status code of 204 (No Content) indicates success, 404 (Not Found) is returned if the requested container was not found, and a 409 (Conflict) if the container is not empty. No response body is generated. For example:

```
HTTP/1.1 204 No Content
Date: Thu, 07 Jun 2010 18:57:07 GMT
Server: Apache
Content-Length: 0
Content-Type: text/plain; charset=UTF-8
```

In one embodiment, HEAD operations against a storage container are used to determine the number of objects, and the total bytes of all objects stored in the container, and for other metadata requests. For example:

```
HEAD /<api version>/<account>/<container> HTTP/1.1
Host: storage.example.com
X-Auth-Token: eaaafd18-0fed-4b3a-81b4-663c99ec1cbb
```

The HTTP return code will be 204 (No Content) if the container exists, and 404 (Not Found) if it does not. The object count and utilization are returned in the X-Container-Object-Count and X-Container-Bytes-Used headers respectively. For example:

```
HTTP/1.1 204 No Content
Date: Wed, 11 Jul 2010 19:37:41 GMT
Content-type: text/html
X-Container-Object-Count: 7
X-Container-Bytes-Used: 413
```

In another embodiment, it is useful to have the objects representable in a virtual hierarchy that is different from an "actual" storage hierarchy. In such an embodiment, the container storage uses paths or delimiters to represent different portions of the hierarchy. For example, in an embodiment supporting virtual hierarchies, the following objects are uploaded to the storage system with names representing their full filesystem path:

```
photos/animals/dogs/poodle.jpg
photos/animals/dogs/terrier.jpg
photos/animals/cats/persian.jpg
photos/animals/cats/siamese.jpg
photos/plants/fern.jpg
photos/plants/rose.jpg
photos/me.jpg
```

Using prefix and delimiter in a GET request we can traverse these virtual directories. Only the request line and results are depicted below excluding other request/response headers:

```
GET /v1/AccountString/backups?prefix=photos/&delimiter=/ HTTP/1.1
Host: storage.example.com
X-Auth-Token: eaaafd18-0fed-4b3a-81b4-663c99ec1cbb
photos/animals/
photos/cats/
photos/me.jpg
```

In one embodiment, any single character can be used as a delimiter. The listings can return virtual directories—they are virtual in that they don't actually represent real objects, and will be listed in a subdir section of json and xml results. In one embodiment, it is possible to use directory markers with prefix and delimiter, as they will be listed as regular files but with Content-Type of application/directory.

In one embodiment, objects stored in the system can be saved, modified, deleted, or otherwise manipulated using the REST API. Metadata for an object can be included by adding custom HTTP headers to the request and the data payload as the request body.

In one embodiment, GET operations against an object are used to retrieve the object's data. Conditional GET requests can be made by using certain HTTP headers as documented in RFC 2616, including: If-Match, If-None-Match, If-Modified-Since, and If-Unmodified-Since. In addition, some embodiments may also support a X-Object-Filter header having similar functionality to the filter parameter for object names. It is also possible to fetch a portion of data using the HTTP Range header, such as by using OFFSET and/or LENGTH. For example, a GET request for an object is as follows:

```
GET /<api version>/<account>/<container>/<object> HTTP/1.1
Host: storage.example.com
X-Auth-Token: eaaafd18-0fed-4b3a-81b4-663c99ec1cbb
```

The object's data is returned in the response body. Object metadata is returned as HTTP headers. A status of 200 (Ok) indicates success; status 404 (Not Found) is returned if no such object exists. The server response is:

```
HTTP/1.1 200 Ok
Date: Wed, 11 Jul 2010 19:37:41 GMT
Server: Apache
Last-Modified: Fri, 12 Jun 2010 13:40:18 GMT
```

```
ETag: b0dffe8254d152d8fd28f3c5e0404a10
Content-type: text/html
Content-Length: 512000
[ . . . ]
```

In one embodiment, PUT operations are used to write, or overwrite, an object's metadata and content. In a further embodiment, end-to-end data integrity can be ensured by including an MD5 checksum of the object data in the ETag header. The HTTP response will include the MD5 checksum of the data written to the storage system. Objects can be assigned custom metadata by including additional HTTP headers on the PUT request. For example:

```
PUT /<api version>/<account>/<container>/<object> HTTP/1.1
Host: storage.example.com
X-Auth-Token: eaaafd18-0fed-4b3a-81b4-663c99ec1cbb
ETag: 8a964ee2a5e88be344f36c22562a6486
Content-Length: 512000
X-Object-Meta-PIN: 1234
```

No response body is returned. A status code of 201 (Created) indicates a successful write; status 412 (Length Required) denotes a missing Content-Length or Content-Type header in the request. If the MD5 checksum of the data written to the storage system does NOT match the (optionally) supplied ETag value, a 422 (Unprocessable Entity) response is returned. An example server response is:

```
HTTP/1.1 201 Created
Date: Thu, 07 Jun 2010 18:57:07 GMT
Server: Apache
ETag: d9f5eb4bba4e2f2f046e54611bc8196b
Content-Length: 0
Content-Type: text/plain; charset=UTF-8
```

Users can upload data without needing to know in advance the amount of data to be uploaded. Users can do this by specifying an HTTP header of Transfer-Encoding: chunked and not using a Content-Length header.

In one embodiment, objects can be copied server-side using a PUT request. In a first embodiment supporting PUT, the user performs a PUT to the new object (the target) location, but adds an "X-Copy-From" header to designate the source of the data. The header value should be the container and object name of the source object in the form of "/container/object". Also, the X-Copy-From PUT requests require a Content-Length header, even if it is zero (0).

In a second embodiment, objects are copied using a COPY request. The user performs a COPY to the existing object and includes the "Destination" header to specify the target of the copy. The header value is the container and new object name in the form of "/container/object".

In one embodiment, the content type of an object can be changed by using either PUT or COPY. The object is copied to itself and set the content type to a new value.

In one embodiment, DELETE operations on an object are used to permanently remove that object from the storage system (metadata and data). Deleting an object is processed immediately at the time of the request. Any subsequent GET, HEAD, POST, or DELETE operations will return a 404 (Not Found) error. For example:

```
DELETE /<api version>/<account>/<container>/<object> HTTP/1.1
Host: storage.example.com
X-Auth-Token: eaaafd18-0fed-4b3a-81b4-663c99ec1cbb
```

No response body is returned. A status code of 204 (No Content) indicates success, status 404 (Not Found) is returned when the object does not exist. For example:

```
HTTP/1.1 204 No Content
Date: Thu, 07 Jun 2010 20:59:39 GMT
Server: Apache
Content-Type: text/plain; charset=UTF-8
```

In an embodiment supporting either a copy by PUT or a COPY request and a DELETE request, a move can be accomplished by using COPY+DELETE. In a second embodiment, a MOVE request is supported, with semantics similar to COPY+DELETE.

In one embodiment, the destination container must exist before attempting the copy. To perform a move of the objects rather than a copy, a DELETE request is sent to the old object. A move is a COPY+DELETE. All metadata is preserved during the object copy. Note that an API user can set metadata on the request to copy the object (either the PUT or the COPY) and the metadata will overwrite any conflicting keys on the target (new) object. In one embodiment, an object can be copied to itself and set the content type to a new value.

In one embodiment, HEAD operations on an object are used to retrieve object metadata and other standard HTTP headers. Authorization headers can be added for access control purposes. For example:

```
HEAD /<api version>/<account>/<container>/<object> HTTP/1.1
Host: storage.example.com
X-Auth-Token: eaaafd18-0fed-4b3a-81b4-663c99ec1cbb
```

No response body is returned. Metadata is returned as HTTP headers. A status code of 200 (OK) indicates success; status 404 (Not Found) is returned when the object does not exist. The server response is:

```
HTTP/1.1 200 OK
Date: Thu, 07 Jun 2010 20:59:39 GMT
Server: Apache
Last-Modified: Fri, 12 Jun 2010 13:40:18 GMT
ETag: 8a964ee2a5e88be344f36c22562a6486
Content-Length: 512000
Content-Type: text/plain; charset=UTF-8
X-Object-Meta-Meat: Bacon
X-Object-Meta-Fruit: Bacon
X-Object-Meta-Veggie: Bacon
X-Object-Meta-Dairy: Bacon
```

In a further embodiment, POST operations against an object name are used to set and overwrite arbitrary key/value metadata. In one embodiment, the POST operation cannot be used to change any of the object's other headers such as Content-Type, ETag, etc. To distinguish particular headers, key names can be put into a particular namespace, such as X-Object-Meta-. A POST request will delete all existing metadata added with a previous PUT/POST. For example:

```
POST /<api version>/<account>/<container>/<object> HTTP/1.1
Host: storage.swiftdrive.com
X-Auth-Token: eaaafd18-0fed-4b3a-81b4-663c99ec1cbb
X-Object-Meta-Fruit: Apple
X-Object-Meta-Veggie: Carrot
```

No response body is returned. A status code of 202 (Accepted) indicates success; status 404 (Not Found) is returned when the requested object does not exist. The server response is:

```
HTTP/1.1 202 Accepted
Date: Thu, 07 Jun 2010 20:59:39 GMT
Server: Apache
Content-Length: 0
Content-Type: text/plain; charset=UTF-8
```

The mapping of these REST-based operations to SOAP, XML-RPC, CORBA, DCE/COM, or other distributed or remote procedure call protocols is straightforward.

Large Object Support

In an embodiment, the file storage system 100 may include a limit on the size of any single object or file that may be uploaded (e.g., 5 GB.) However, the storage and download size of any single object in the file storage system 100 may be made virtually unlimited by segmenting objects as described herein. Those of skill in the art will note that even though this is discussed in the context of "large" files, segmented file storage is equally applicable to any number of files, and the absolute size of the file is not a limitation.

In one embodiment, a large object (e.g., a large object over a threshold size), or any object that is to have segmented storage, may be segmented into a plurality of object segments that are each under the system size limit, those object segments may then each be uploaded and stored individually in the storage pools 214 provided in the storage servers 108, and a manifest file may be created that includes details about the plurality of object segments that allow the plurality of object segments to be provided to reproduce the large object. The manifest file may be a file that is separate from the object segments, a header in an object segment (e.g., the first object segment that was segmented from the large object), and/or provided in a variety of other manners known in the art. Thus, in an embodiment, the manifest file for a large object may be accessed (e.g., by a user to download the large object from the file storage system 100 to the user device 102) and used to find each of the object segments for that large object (e.g., the manifest file may include the name of each object segment for that large object), determine the appropriate order of those object segments, and send those object segments to the user, concatenated in order, to provide the large object to the user device 102. This technique offers greater upload speeds than are provided by conventional means by enabling the parallel upload of the different object segments related to a particular large object, as described in further detail below.

In one embodiment, the manifest is created and explicitly PUT by the user to the container where the large object is to reside. In a second embodiment, the manifest is created by the system and has an internal format that is not directly addressable from the outside. In a third embodiment, the manifest is created in response to an X-Object-Manifest header and/or X-Object-Segment options included with a PUT. For example (trimmed for concision):

```
PUT /<api version>/<account>/<container>/<object> HTTP/1.1
Host: storage.example.com
X-Auth-Token: eaaafd18-0fed-4b3a-81b4-663c99ec1cbb
ETag: 8a964ee2a5e88be344f36c22562a6486
X-Object-Meta-PIN: 1234
X-Object-Segment-Size: 4194304
X-Object-Segment-Compression: None
X-Object-Manifest:
object.segments/00000000001.data;MD5=
af254b822eb5953606f731628967c185|
object.segments/00000000002.data;MD5=
0305d718926ac8776a442023509c21ce|
object.segments/00000000003.data;MD5=
8d936fca1e4d7669450328c715b67afc| [ . . . ]
```

This request specifies a 4 MB segment size, a hash value for the file has a whole, a specific naming scheme for the data segments, and hash values for each segment. No response body is returned. A status code of 201 (Created) indicates a successful write. If the MD5 checksum of the entire data written to the storage system does NOT match the (optionally) supplied ETag value, a 422 (Unprocessable Entity) response is returned. An example server response is:

```
HTTP/1.1 201 Created
Date: Thu, 07 Jun 2010 18:57:07 GMT
Server: Apache
ETag: d9f5eb4bba4e2f2f046e54611bc8196b
Content-Length: 0
Content-Type: text/plain; charset=UTF-8
```

If an explicit manifest including MD5 values is provided and one or more segments are not correct, then the server can also return a 409 (Conflict) with one or more X-Segment-Unprocessable headers identifying the non-matching headers.

In one embodiment, the size of the object segments created when segmenting a large file may be specified, e.g., 1 GB. In that embodiment, the system would segment any large object into 1 GB object segments and begin uploading each of those 1 GB object segments in parallel to the storage pools 214 provided by the storage servers 108, as discussed above. The manifest file may be created before, during, or after the segmentation of the large object. In one embodiment, all the object segments for a large object may be uploaded into a container with names like large_file/1290206778.25/21474836480/00000000, large_file/1290206778.25/21474836480/00000001, etc. It may be beneficial to use a separate container for the object segments in order to prevent the main container listings from becoming polluted with all the segment names. In such an embodiment, the manifest file is placed in the container as a placeholder for the large file. The manifest is distinguished from a "regular" file by the use of a metadata flag or a special name, such as filename.extension.manifest. In this case, the "manifest" extension may be hidden from view and appear only internally as an implementation hint for the system to recognize and use the segmented file support. A second container, the "segment container" is set up using the name of the large file as the container name. In one exemplary embodiment, if the large file is named "datafile," the manifest is named "datafile.manifest" and is located in the container where "datafile" has been placed by the end user. There is a hidden container named "datafile.segments" that contains the different portions of the datafile according to a naming scheme such as the ones above.

It is expected that the existence of the datafile.segments container will be hidden in most interactions with the system, but some embodiments may find it useful to allow direct addressing of segment parts. In such an embodiment, this is done through the use of the standard APIs used for containers, so that a user can ask for the listing of "datafile.segments", update a particular segment, or append to datafile by sending a new file object to the container "datafile.segments." In one embodiment, the standard list/update/write/delete commands can similarly be used for segment modification. In a further embodiment, writes to the segment container are transparently synchronized with changes to the manifest so that the manifest is updated automatically. In another embodiment, the manifest is updated explicitly.

The use of a segment name format such as <name>/<timestamp>/<size>/<segment> provides that an upload of a new file with the same name won't overwrite the contents of the first until the last moment when the manifest file is updated; the new object can be uploaded and moved to the new place transparently.

In one embodiment, the segmentation of a large object may be performed by the storage management server 106. For example, in response to a user request to upload a large object from the user device 102 to the storage servers 108, the proxy 204 may determine a plurality of object segments for the large object on the user device 102, create a manifest file related to the large object and object segments, and upload each of those object segments separately (e.g., in parallel) from the user device 102 for storage in the storage pools 214 provided by the storage servers 108. In another example, in response to a user request to upload a large object from the user device 102 to the storage servers 108, the proxy 204 may upload the large object to the storage management server 106, segment the large object into a plurality of object segments, create a manifest file related to the large object and object segments, and store those object segments in the storage pools 214 provided by the storage server 108. In this embodiment, the large object may be deleted on the storage management server 106 once the object segments for that large object are stored in the storage pools 214 provided by the storage servers 108.

In another embodiment, the segmentation of the large object may be performed by the user device 102. For example, in response to a user command to upload a large object from the user device 102 to the storage servers 108, the user device 102 may segment the large object into a plurality of object segments, create a manifest file related to the large object and object segments, and send the manifest file and the plurality of object segments to the proxy 204 for storage in the storage pools 214 provided by the storage servers 108. In an embodiment, the user device 102 may provide the object segments of a large object to the proxy for storage directly into a container in the file storage system 100 such that all of the object segments have a common object name prefix, which may allow the object segment names to sort in the order that the object segments are to be concatenated. However, a variety of other sorting techniques will fall within the scope of the present disclosure. The user device 102 may then create a manifest file identifying the container and object name prefixes, and that manifest file may be sent to the file storage system 100 such that the object segments may later be provided or downloaded as their related large object.

As discussed above, each of the object segments related to a large object are stored individually in the storage pools 214 provided by the storage servers 108. In an embodiment, each of the object segments are treated by the file storage system 100 as separate objects in the system (e.g., each object segment is treated the same as an object that was not segmented from a larger objected), and may be stored in the same manner as described for objects in the method 400 above. In an embodiment, each of those separate object segments may be assigned a unique identifier (e.g., a file name) that allows the object segment to be stored, read, written, and/or otherwise manipulated by the file storage system 100 separately from other object segments that were created from the same large object. Thus, each object segment may be replicated as an individual object as discussed above. For example, each of the plurality of object segments related to a particular large object may be replicated in a plurality of the storage pools 214 such that a first object segment is replicated in a first storage pool, a second object segment is replicated in a second storage pool, and so on. Furthermore, object segments created from the same large object may be treated separately when balancing the amount of data stored in the storage pools 214, e.g., as discussed above with reference to the method 600. For example, a plurality of object segments related to a particular large object may be stored in a first storage pool of the plurality of storage pools 214, a plurality of object segments related to that particular large object may be stored in a second storage pool of the plurality of storage pools 214, and so on, until the amount of data stored in the first storage pool, the second storage pool, and any other storage pools, is balanced according to one or more predetermined parameters.

A factor that drives the limitation of object size in the file storage system 100 involves the desire to maintain balance with regard to the amount of data (e.g., object replicas, partition replicas, etc.) stored by storage pools 214 in the file storage system 100, as discussed above. To maintain an even dispersion of data storage throughout the storage pools 214 in the file storage system 100, larger objects are each split into smaller objects segments that are then written to the storage pools, and those object segments may then be pieced back together to provide the large object during a read. This storage method allows a user to backup and archive large data sets. In one exemplary embodiment, the user can begin to stream a large file using a chunked transfer encoding. A system chunksize can be set so that after a set number of bytes, the system creates a new chunk, updates the manifest, and continues saving the dataset. In a second embodiment, each chunk in a chunked/transfer encoding is included in its own segment, allowing for the streaming of files of unlimited size. In a third embodiment, a header X-Object-Segment-Size is set to indicate the desired chunk size for this object.

In a further embodiment, this improves performance and/or reduces errors due to network interruption. For example, using a chunked transfer encoding, each chunk would be received and processed individually, without having to wait for the entire file to upload. In the event of a network interruption affecting one of the chunks, only the one chunk would need to be re-uploaded (or alternatively, only one chunk would be lost).

In one embodiment, the file storage system may provide transparent uploads from the user device 102 by automatically splitting objects into objects segments during upload using the proxy 204 such that no changes to the client API (on the user device 102) are necessary. In an embodiment, all segments may be completely hidden from the client API. In another embodiment, an explicit "user manifest" can provide for transparent upload and download of large objects, while still providing an API for the listing, creation, deletion, and manipulation of individual segments. In one currently preferred embodiment, the user manifest is hidden from the user under most circumstances so that large or other segmented objects work identically to non-segmented objects. When explicitly requested, however, the manifest file and individual segments of the large file are individually addressable and manipulable via the system—either internally for better performance, externally through an API such as the container and object APIs, or both.

The manifest file for a large object and its object segments may be utilized in a variety of manners. In an embodiment, the manifest file may be used for data verification. For example, a data verification operation such as, for example, a checksum, may be performed on each object segment of a large object (e.g., upon upload of the object segment to the storage pools 214), and the result of that checksum (e.g., a data verification result) may be associated with that object segment in the manifest file. During subsequent download requests for the large object, a checksum may be performed on the object segments to be downloaded, and the results of that checksum may be compared with the data verification results included in the manifest file in order to verify that the object segments to be downloaded are the correct object segments. In another embodiment, the manifest file may be used for error correction. For example, given a plurality of object segments created from a large object, an error correction operation may be performed on a first object segment and a second object segment to produce an error correction result (e.g., a value that is associated with the difference between the first object segment and a second object segment), and that error correction result may be associated with the first object segment in the manifest file. During a subsequent download of the large object, in the event the second object segment cannot be located, that error correction result associated with the first object segment may be retrieved from the manifest file and a reverse calculation performed on the error correction result in order to recreate the second object segment. While a few examples of auxiliary uses of the manifest file have been described, one of skill in the art will recognize that a variety of other manifest file uses will fall within the scope of the present disclosure.

In an embodiment, the size of object segments created from a large object may be optimized for a number of functions of the file storage system 100. Object segment sizes may be optimized such that the time needed to reproduce the large object (e.g., download the object segments to the user device 102 from the storage pools 214 provided by the storage servers 108 such that the large object is available for use by the user) is minimized. For example, a large object may be a high definition video file, and optimization of object segments for that large object may be provided by including equal sized object segments that are relatively close to the system size limit (e.g., because each of the object segments is of equal importance in reproducing the high definition video.) In another example, a large object may be a map, and optimization of object segments for that large object may be provided by including object segments of different sizes that are relatively smaller than the system size limit (e.g., because some portions of the map may be accessed more often than others, the map require less storage space, etc.)

Referring now to FIG. 7a, an embodiment of a method 700 for storing large object data is described. The method 700 begins at block 702 where a request to upload a large object to a storage server is received from a user device. In one embodiment, the request to upload the large object to the storage servers 108 is received from the user 202 (though the user device 102) by the proxy 204. In another embodiment, the request to upload the large object to the storage servers 108 is received from the user 202 by the user device 102.

The method 700 then proceeds to block 704 where it is determined (e.g., by the proxy 204, the user device 102, etc) that the large object exceeds a predetermined threshold size (e.g., greater than 5 GB). The method 700 then proceeds to block 706 where the large object is segmented into a plurality of object segments, each object segment not exceeding the predetermined threshold size, and a manifest file is generated that is related to the large object and object segments and permits the identification of all of the object segments, their relationship to each other, and/or their relationship to the large object. In an embodiment, the size of each object segment may be set according to the user's specifications, by an administrator of the file storage system 100, and/or using a variety of other methods known in the art. The sizes of the object segments need not be uniform, and may be optimized as discussed above. In one embodiment, each object segment generated at block 706 for a given large object is given a filename that 1) identifies the large object from which the object segment was generated, 2) includes a timestamp that identifies when the object segment was created, 3) identifies the size of the object segment, and 4) identifies the object segment relative to other objects segments generated from the same large object (e.g., the order of the object segment relative to other object segments may be identified such that 0 is used for a first object segment, 1 is used for a second object segment, etc.). The manifest file is generated and the object segment filenames and/or other large object or object segment information is referenced in the manifest file. The manifest file may also be include information for use in data verification, error correction, and/or other uses, as discussed above. At 708, each object segment generated at block 706 may then be treated as an individual and separate object (e.g., the objects 304 discussed above) that may be uploaded to the file storage system 100 and stored in the storage pools 214 as if received from a user according to method 400. In one embodiment, all of the object segments generated at block 706 for a given large object may be uploaded to a single container 302.

Figure 7B:
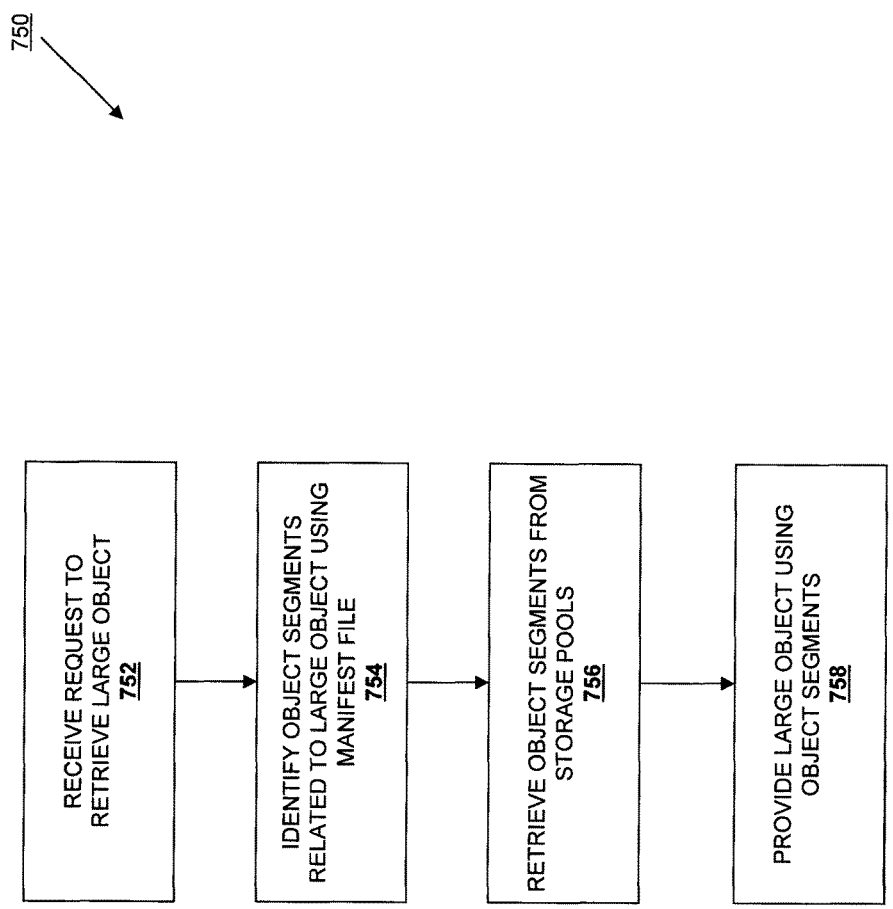
FIG. 7b is a flow chart illustrating an embodiment of a method for retrieving large object data.

Referring now to FIG. 7b, an embodiment of a method 750 for retrieving large object data is described. The method 750 beings at block 752 where a request is received to retrieve a large object that is stored in the storage pools 214 as object segments according to method 700. In an embodiment, a request from the user 202 to retrieve a large object is received from the user device 102 over the network 104 by the proxy 204 in the storage management server 106. The method 750 then proceeds to block 754 where the manifest file associated with the requested large object is retrieved and the object segments related to the large object are identified. In an embodiment, the proxy 204 retrieves the manifest file associated with the requested large object (e.g., from one of the storage servers 108, storage pools 214, and/or other storage devices) and identifies the object segments in the manifest file. The method 750 then proceeds to block 756 where the identified object segments related to the requested large object are individually retrieved from the file storage system 100. In an embodiment, the proxy 204 retrieves each of the identified object segments from their locations in the storage pools 214 provided by the storage servers 108. The method 750 then proceeds to block 758 where the large object is provided to the user device 102 by providing the retrieved object segments according to the manifest file. As discussed above, the manifest file may be used for data verification of the object segments and/or error correction of missing object segments during the method 750.

The object segmentation discussed above also provides a number of benefits when appending or otherwise adding information to a large object that has been segmented in the system. The information to be added to a large object as one or more new object segments that may include a common object segment size associated with the large object, that may be arbitrarily sized relative to other object segments for the large object, that may be sized different depending on the file type (e.g., video, text, etc.) of the large object, and/or may include a variety of other characteristics known in the art. While a few examples of appending or otherwise adding information to a large object are described below, those example are not meant to be limiting, and one of skill in the art will recognize that a variety of large object modification will fall within the scope of the present disclosure.

In one embodiment, a large object may be appended (e.g., additional information may be added to the end of the large object.) This particularly useful for streaming applications such as continuous writes, logging, or video archiving. For example, a large object may include video file (e.g., security video) that is captured and saved every day in the file storage system 100. Thus, on a given day, the file storage system 100 may include a plurality of object segments for the large object video file (e.g., portions of the video) that were previously stored in the storage pools 214 provided by the storage servers 108. Upon upload of a new portion of the video to the file storage system 100 for storage as part of the large object video file, that new portion of the video may be provided as a new object segment or segmented into a plurality of new object segments and stored in the file storage system 100 as discussed above according to the method 700. The manifest file for that large object video file will then be modified to include these new object segments such that the manifest file associates the new object segments with the large object video file in the same manner as the object segments that were originally created from the large object video file upon initial upload of the large object video file to the file storage system 100. Thus, a large object video file may be stored in the system as object segments 1, 2, and 3, and a manifest file may associate the object segments 1, 2 and 3 with the large object video file. When a new portion of the large object video file is uploaded, that new portion may be segmented into object segments 4 and 5 and uploaded to the file storage system 100, and the manifest file may then be modified in order to associate object segments 4 and 5 (as well as object segments 1, 2, and 3) with the large object video file. In response to a user request to download the large object video file, the manifest file may then be used to retrieve and provide object segments 1, 2, 3, 4, and 5 to the user device 102 in order to provide the complete large object video file to the user.

In another embodiment, information may be added at any location in a large object. For example, using the large object video file discussed above, one of a plurality of camera feeds from a security system may fail to upload to the file storage system 100 (e.g., due to a network cable to the camera becoming unplugged, etc.) Thus, for one or more days, the large object video file stored as object segments in the system may be missing the feed from one of the cameras (e.g., a video feed from a given day may include object segments 1, 2, and 3 corresponding to feeds from cameras 1, 2, and 3 in the security system, but may be missing a feed from camera 4.) In the event that the feed from camera 4 is recovered, the system of the present disclosure allows that feed to be later stored in the file storage system 100 and retrievable with the large object video file. For example, time may have passed in which further video was saved in the system as object segments of the large object video file (e.g., object segments 4-10). In that event, the feed from camera 4 is then saved in the file storage system 100 as object segment 11 for the large object video file. The manifest file for the large object video file is then updated to indicate that the object segment 11 that includes the feed from camera 4 should be associated with the large object video file in the appropriate position. Thus, the large object video file may be stored in the system as object segments 1-11, and the manifest file may associate the object segments 1-11 with the large object video file, but with an order of 1, 2, 3, 11, 4, 5, 6, 7, 8, 9, and 10 (thus positioning the later added video in object segment 11 (e.g., the feed from camera 4 on a given day) in its appropriate position with object segments 1-3 (e.g., the feeds from cameras 1-3 on the given day).

Figure 8:
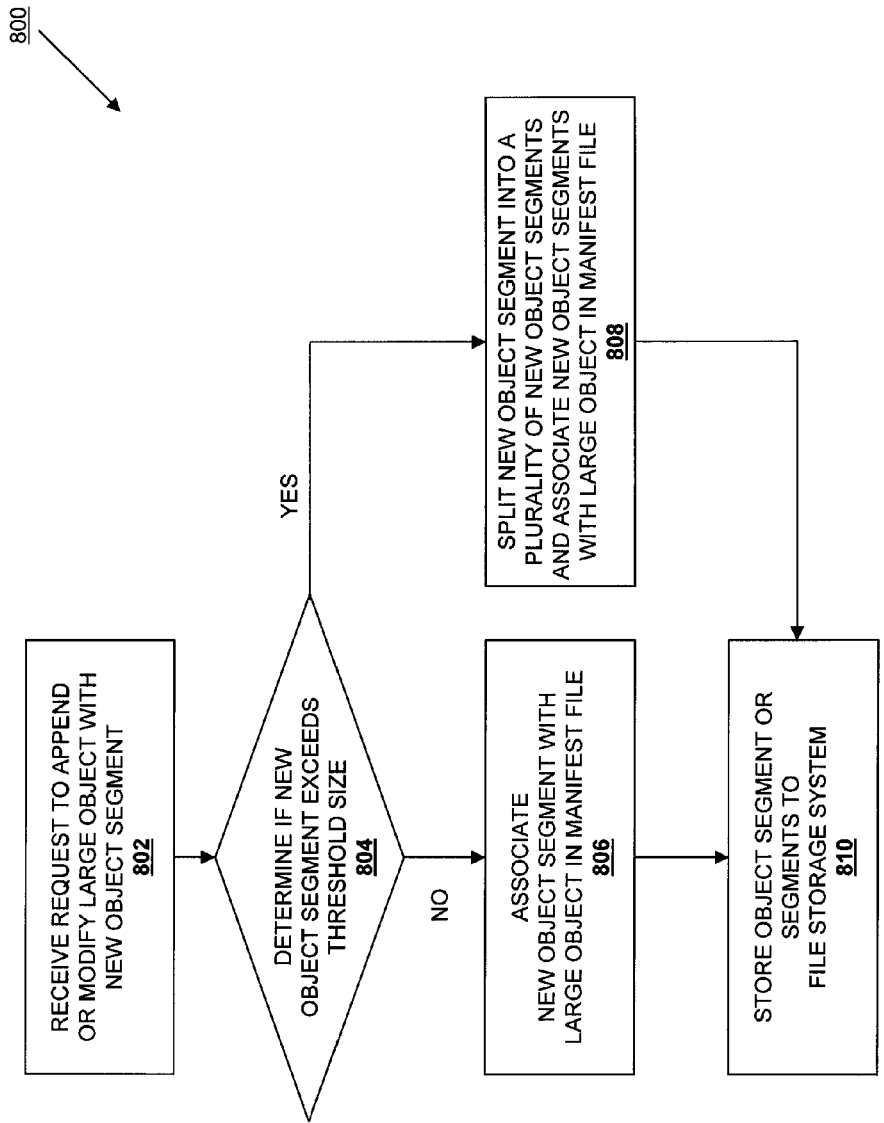
FIG. 8 is a flow chart illustrating an embodiment of a method for appending data to a large object.

Referring now to FIG. 8, an embodiment of a method 800 is disclosed for appending an existing large object, which has been segmented into object segments that are stored in the file storage system 100 according to method 700, with a new object segment. At block 802, the file storage system 100 a command is received to append or modify an existing large object in the file storage system 100 with a new object segment (e.g., a portion of a large object that has not yet been stored in the file storage system 100). In an embodiment, the request to append or modify the existing large object with the new object segment may be accompanied by new object segment. In an embodiment, the append command includes instructions to add the new object segment to the end of the existing large object. In another embodiment, the modify command includes instructions to add the new object segment a position within the existing large object.

The method 800 then proceeds to decision block 804 where it is determined whether the new object segment received at block 802 exceeds a predetermined threshold size (e.g., greater than 5 GB). If the new object segment received at block 802 does not exceed a predetermined threshold size, the method 800 proceeds to block 806 where the new object segment received at block 802 is associated with the existing large object in a manifest file. In an embodiment, the new object segment is given a filename that corresponds to the filenames referenced in the manifest file for the existing large object (i.e., identifying the same large object, the timestamp when the object to be appended was generated, and the size of the object to be appended, etc.) and identifying the order of the new object segment relative to the previously stored object segments of the existing large object. For example, if the command at block 802 is an append command and the last previously stored object segment of the existing large object is 4, the new object segment to be appended may be identified as 5 and indicated in the manifest file as following the object segment 4. In another example, if the command at block 802 is a modify command and the previously stored object segments of the existing large object are 1-10, the new object segment to be added to the existing large object may be identified as 11 and indicated in the manifest file as being located in the appropriate position between the object segments 1-10 as indicated in the modify command.

If, at decision block 804, the new object segment received at block 802 exceeds a predetermined threshold size, the method 800 proceeds to block 808 where the new object segment received at block 802 is first split into a plurality of new object segments that each do not exceed the predetermined threshold size, and each of those new object segments is then associated with the large object in the manifest file. In an embodiment, the new object segments are given filenames that corresponds to the filenames referenced in the manifest file for the existing large object (i.e., identifying the same large object, the timestamp when the object to be appended was generated, and the size of the object to be appended, etc.) and identifying the order of the new object segments relative to the previously stored object segments of the existing large object. For example, if the command at block 802 is an append command and the last previously stored object segment of the existing large object is 4, the new object segments to be appended may be identified as 5 and 6 and indicated in the manifest file as following the object segment 4, respectively. In another example, if the command at block 802 is a modify command and the previously stored object segments of the existing large object are 1-10, the new object segments to be added to the existing large object may be identified as 11 and 12 and indicated in the manifest file as being located in the appropriate positions between the object segments 1-10 as indicated in the modify command. Thus, the manifest file for the existing large object is modified to add the filename(s) generated for the new object segment(s) at blocks 806/808 such that the new object segment received at block 802 is treated by the file storage system 100 as part or parts of the existing large object. The method 800 then proceeds to block 810 where the new object segment(s) in blocks 806 or 808 are stored in the file storage system 100.

One of skill in the art with recognize that the ability of the system to append or modify a large object file with individual object segments provides several advantages. In one embodiment, a copy-on-write system may be implemented. For example, a large object such a video file may be stored in the file storage system 100 as a plurality of object segments 1-10. Such a large object may then be edited by a plurality of users 1-3 while saving storage capacity in the file storage system as follows. Each of the plurality of users 1-3 may be supplied with a copy of the manifest file of the large object, and each of the plurality of users may retrieve any object segment of the large object for editing. In response to determining a change has been made to an object segment by a user, a new object segment including that change may be uploaded to the file storage system and the copy of the manifest file provided to that user may be updated with that change. Thus, if user 1 changes object segment 4 of the large object, the changed object segment 4 may be uploaded to the file storage system as new object segment 11 and the copy of the manifest file provided to user 1 will be updated to indicate that object segment 11 now replaces object segment 4 for the large object. Similarly, User 2 may change object segment 6 such that it is uploaded to the file storage system as new object segment 12 and the copy of the manifest file provided to user 2 will be updated to indicate that object segment 12 now replaces object segment 5 for the large object, and user 3 may change object segment 9 such that it is uploaded to the file storage system as new object segment 13 and the copy of the manifest file provided to user 3 will be updated to indicate that object segment 13 now replaces object segment 9 for the large object. Thus, changes made by each of the user 1-3 result in new object segments being uploaded to the file storage system. One of skill in the art will recognize that this example results in 4 versions of the large object: a first version of the existing large object including object segments 1-10 according to the original manifest file, a second version of the large object including the changes that were made by user 1 according to the copy of the manifest file provided to user 1, a third version of the large object including any changes that were made by user 2 according to the copy of the manifest file provided to user 2, and a third version of the large object including any changes that were made by user 3 according to the copy of the manifest file provided to user 3. However, the storage required for these four versions is only that necessary to store object segments 1-10, the object segments changed by users and uploaded (e.g., object segments 11-13), and the manifest files (e.g., the original and the copies provided to users 1-3 and modified with their changes). This provides substantial storage savings over conventional methods, which in this example would require the storage of the four full versions of the large object. Further, a combined edit representing all the individual edits can be created simply by creating one more manifest referencing all the changed sections.

It will be apparent to those of skill in the art that the copy-on-write functionality described above is also sufficient to implement software transactional memory relative to the segmented file. After creating a second manifest to track changes made by a write, the first and second manifests can be evaluated for conflicting changes. If there are no conflicting changes, then the two manifests can be merged and a single manifest provided going forward. If there are conflicting changes, then the changes localized to the second manifest can be discarded and an error returned to the user.

Although various embodiments have been described with reference to files and byte ranges, it is contemplated that a segmented data file may be a structured data file such as a database, LDAP store, key-value store, graph store, or similar. In that case, the individual segments of the file may not be byte ranges, but instead may be shards of the database using a sharding key, single column stores in a columnar database, or portions of a namespace. In that case, the distribution of information into the various file segments is done by separating out records in the structured data file for inclusion in each individual segment. Querying the structured information files located at each segment and performing a secondary operation to reduce the multiple results into a single result reconstructs the original, non-segmented data. Those of skill in the art will note that this also allows for distributed database queries, wherein reconstructing the data is done only to the extent needed to provide the answer to a query. In another embodiment, the large object is a filesystem, and individual segments correspond to on-disk changes, allowing for snapshot backups of a filesystem over time.

In another embodiment, large object rotation and/or "rolling" large objects may be implemented. For example, the large object may be security video that is to be stored in the file storage system 100 for no more than 1 month. Thus, each day, the large object (e.g., previously stored object segments including portions of the video) may be appended with a new object segment (new video from that day), as discussed above. Furthermore, each day, the object segment(s) for the large object that are over 1 month old may be deleted from the file storage system 100 and removed from the manifest file.

Peer-to-peer file sharing protocols (e.g., Bittorrent) are used to facilitate the rapid transfer of data or files over data networks to many recipients while minimizing the load on individual servers or systems. Such protocols generally operate by storing the entire file to be shared on multiple systems and/or servers, and allowing different portions of that file to be concurrently uploaded and/or downloaded to multiple users (or "peers"). A user in possession of an entire file to be shared (a "seed") typically generates a descriptor file (e.g., a "torrent" file) for the shared file, which must be obtained by any peer desiring to download the shared file and provides information on how to connect with the seed and information to verify the different portions of the shared file (e.g., a cryptographic hash). Once a particular portion of a file is uploaded to a peer, that peer may begin uploading that portion of the file to others, while simultaneously downloading other portions of the file from other peers. A given peer continues the process of downloading portions of the file from peers and simultaneously uploading portions of the file to peers until the entire file may be reconstructed and stored in its entirety on that peer's system. Accordingly, transfer of files is facilitated because instead of having only a single source from which a given file may be downloaded at a given time, portions of a file may be uploaded in parallel to other peers, and those peers then function as additional download sources for the portions of the file in their possession. It is not necessary that any particular user have a complete copy of the file as long as all portions of a file are distributed among the network of peers in order for the file to be downloaded, and multiple users can be downloading the same file without overloading any particular peer's resources.

In an embodiment, the file storage system 100 may implement peer-to-peer file sharing protocols with the object segments for large objects. For example, upon receiving a request from a user to upload a large object, the file storage system may determine how to segment the large object into a plurality of object segments (e.g., using metadata about the large object such as information on file type, file size, etc.). The file storage system 100 may then send instructions to object storage entities (e.g., storage pools 214, storage servers 108, etc.) to request the particular object segments determined for the large object (e.g., act as a Bittorrent "leech"). The object storage entities may request the object segments directly from the user device 102, from the proxy 204 if the large object has been uploaded to the storage management server 106, etc. This allows a plurality of object segments of the large object to be uploaded to a plurality of object storage entities in parallel. In an embodiment, the size of the object segments requested by the object storage entites may be selected to be the same size as the cache of the object storage entities (e.g., 64 MB) such that each object segment may be uploaded entirely to the cache of the object storage entity and then written to disk by the object storage entity, which makes the limiting upload factor the upload speed and not the platter speed of the object storage entity. Once the object segment has been written to disk by the object storage entity, the object storage entity may be made available for another object segment. In another example, a request may be received from a user to download a large object and, in response, a "tracker" may be created from the manifest file associated with that large object and that tracker may be provided to the object storage entities to instruct the object storage entities to make available their stored object segment(s) for the requested large object (e.g., act as a Bittorrent "seed"), thereby allowing the user to download object segments from the object storage entities in parallel.

Figure 9A:
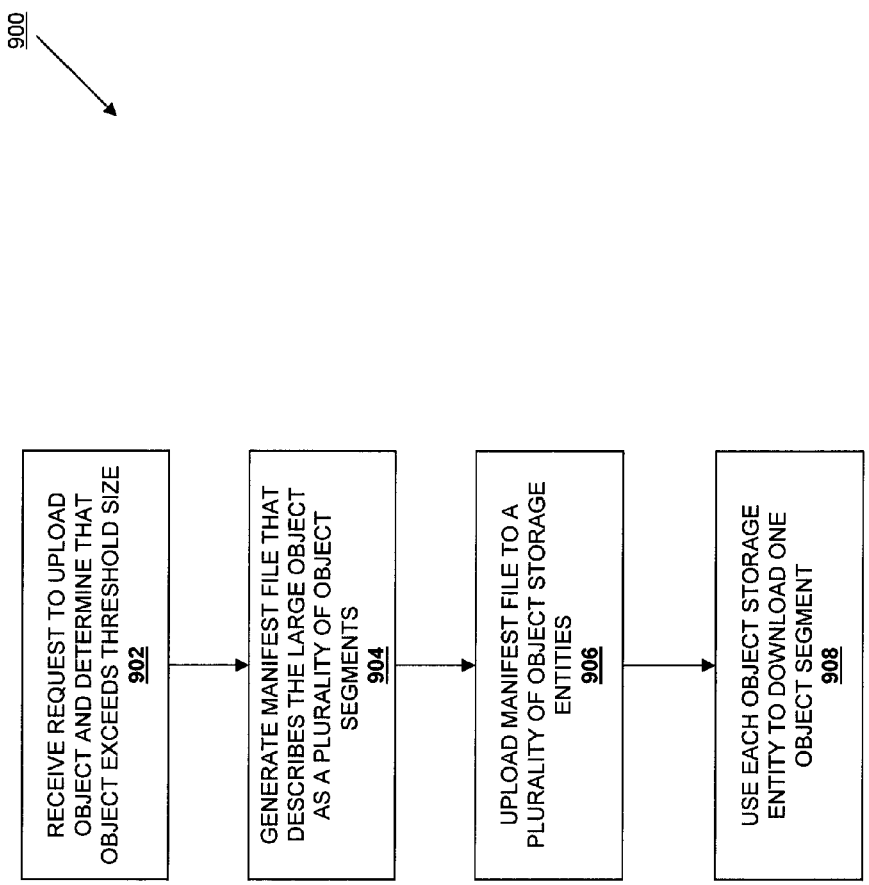
FIG. 9a is a flow chart illustrating an embodiment of a method for storing large objects using a peer-to-peer file sharing protocol.

Referring now to FIG. 9a, an embodiment of a method 900 for storing a large object using a peer-to-peer file sharing protocol is described. At block 902, a request to upload a large object is received from a user, and the large object is determined to exceed a predetermined threshold size (e.g. >5 GB). In an embodiment, the request may include uploading the large object to the file storage system 100. At block 904, a manifest file is generated for the large object that determines a plurality of object segments that are smaller than the predetermined size in accordance with block 706 of method 700. In an embodiment, the manifest file also contains descriptor information corresponding to each object segment for use with a peer-to-peer file sharing protocol. The method 900 proceeds to block 906, where the manifest file is uploaded to a plurality of object storage entities. In an embodiment, the manifest file is uploaded to a number of object storage entities equal to the number of objects segments described in the manifest file for the large object. Once the manifest file is uploaded to the object storage entities, at block 908 each object storage entity downloads one object segment of the large object listed in the manifest file. Download of the object segments may be from storage management server 106 or directly from user device 102 depending on whether the user device 102 uploaded the large object to the storage management server 106 in block 902 of the method 900. Thus, in effect, each object storage entity serves as a "peer" for a particular object segment of the large object to which it has been assigned. In the embodiment in which the large object was uploaded to the storage management server 106, once all of the object segments of the large object have been downloaded by the object storage entities, the original copy of the large object on the storage management server 106 may be deleted.

Figure 9B:
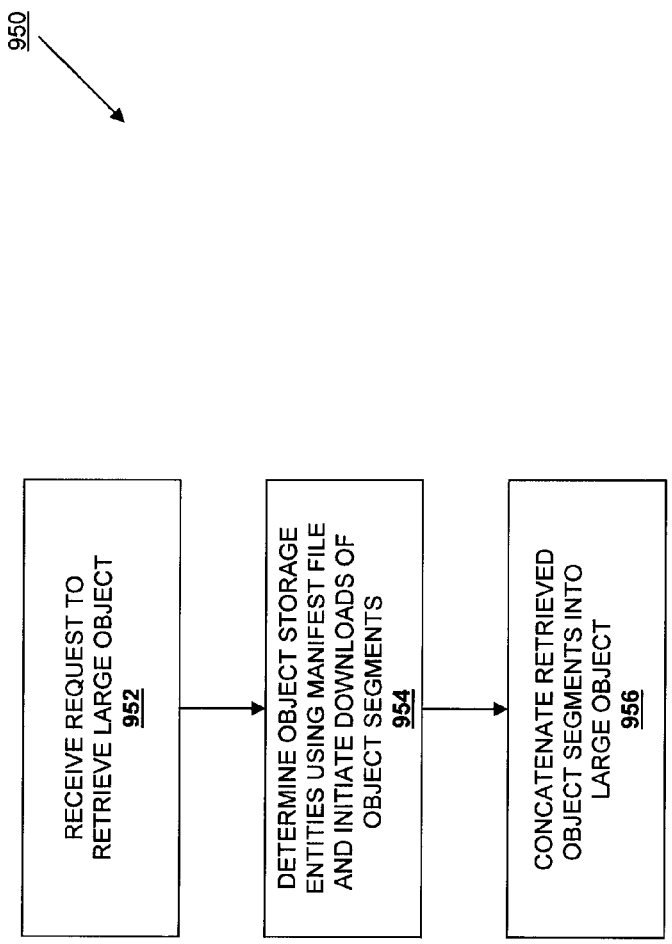
FIG. 9b is a flow chart illustrating an embodiment of a method for retrieving large objects using a peer-to-peer file sharing protocol.

Referring now to FIG. 9b, an embodiment of a method 950 for retrieving a large object using a peer-to-peer file sharing protocol is described. At block 952, a request to download a large object is received from one or more users. In one embodiment, the requests are received from a plurality of users 202 by one or more proxies 204. At block 954, the manifest file for the large object is used to determine the appropriate object storage entities for each of the object segments of the requested large object, and the object storage entities allow the download of objects segments to the user using a peer-to-peer file sharing protocol. In one embodiment, a plurality of users concurrently connect to the object storage entities for the same large object, and may download different object segments from the object storage entities simultaneously, as well as from each other, until all object segments have been downloaded. At block 956, the downloaded object segments are concatenated for each user into the large object according to the manifest file.

Even though illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A network file system, the system comprising:
   a storage management server, the storage management server further comprising a processor, a network interface and a filesystem export module; and
   at least one computer-readable storage coupled to the storage management server, wherein the at least one computer-readable storage includes a plurality of individually individual stored object segments and a first manifest, wherein each of the plurality of individually stored object segments correspond to a portion of the data in the filesystem, and wherein the first manifest describes the relationship of the plurality of individually stored object segments to the filesystem sufficient for the filesystem export module to present a filesystem interface in response to communications received over the network interface,
   wherein each of the plurality of individually stored object segments corresponds to a portion of data in an initial version of a segmented file in the filesystem, wherein a first individually stored object segment of the plurality of individually stored object segments is stored in a first storage pool, and wherein a partition is mapped to the first storage pool, the first storage pool is located in a first zone, and data stored within the first storage pool are subject, based on a single event, to a correlated loss of access,
   wherein the storage management server calculates a first checksum for the first stored object segment, replicates the first individually stored object segment, and calculates a second checksum for the replicated object segment, wherein the first checksum is associated with the first stored object segment in the first manifest, and
   wherein the storage management server stores the replicated object segment into a second storage pool different from the first storage pool upon determining the first checksum matches the second checksum, the second storage pool is located in a second zone different from the first zone, and data stored within the second storage pool are subject to a correlated loss of access.

2. The system of claim 1, further comprising:
   a snapshot module, wherein the snapshot module receives a request for write access to the filesystem and creates a second manifest responsive to the request.

3. The system of claim 2, further comprising: a file writer module, wherein the file writer module stores at least one new individually stored object segment containing the differential changes caused by the request for write access in a second storage pool, wherein the partition is mapped to the second storage pool, the second storage pool is located in a second zone different from the first zone, and data stored within the second storage pool are subject to a correlated loss of access.

4. The system of claim 3, wherein the first manifest describes the relationship of the plurality of individually stored object segments to the segmented file to reconstitute the initial version of the segmented file.

5. The system of claim 4, wherein the second manifest describes the relationship of individually stored object segments and the differential changes caused by the request for write access to the segmented file to reconstitute a modified version of the segmented file.

6. The system of claim 5, wherein the first and second manifests are accessible in the filesystem.

7. The system of claim 1, wherein the storage management server modifies the first manifest to identify a reconstruction of the segmented file.

8. The system of claim 7, wherein the reconstruction includes the object data from the first data range as well as information from the plurality of preexisting object segments, and the reconstruction includes the replicated object segment rather than the first individually stored object segment.

9. The system of claim 1, wherein the plurality of individual stored object segments corresponds to one or more blocks from a block device.

10. The system of claim 1, wherein the plurality of individually stored object segments corresponds to one or more inodes from a filesystem.

11. The system of claim 1, wherein the plurality of individually stored object segments corresponds to one or more files from a filesystem.

12. The system of claim 1, wherein the network file system has a limit on a size of any single object that is uploaded.

13. The system of claim 12, wherein each stored object segment is smaller than the limit.

14. The system of claim 12, wherein the first manifest is separate from the plurality of individually stored object segments.

15. The system of claim 12, wherein the first manifest is a header in the first stored object segment.

16. The system of claim 1, wherein the first manifest references each of the plurality of individually stored object segments.

17. The system of claim 16, wherein the first manifest references includes a name of each of the plurality of individually stored object segments.

* * * * *